(12) United States Patent
Win et al.

(10) Patent No.: US 12,151,834 B2
(45) Date of Patent: Nov. 26, 2024

(54) MONO-WING AERIAL DEVICE AND METHOD OF FORMING THE MONO-WING AERIAL DEVICE

(71) Applicant: Singapore University of Technology and Design, Singapore (SG)

(72) Inventors: Luke Soe Thura Win, Singapore (SG); Shane Kyi Hla Win, Singapore (SG); Shaohui Foong, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 73 days.

(21) Appl. No.: 18/004,454

(22) PCT Filed: Jul. 7, 2021

(86) PCT No.: PCT/SG2021/050399
§ 371 (c)(1),
(2) Date: Jan. 6, 2023

(87) PCT Pub. No.: WO2022/010419
PCT Pub. Date: Jan. 13, 2022

(65) Prior Publication Data
US 2023/0312142 A1    Oct. 5, 2023

(30) Foreign Application Priority Data

Jul. 7, 2020    (SG) .............................. 10202006551T

(51) Int. Cl.
*B64U 30/10*     (2023.01)
*B64U 10/25*     (2023.01)
(Continued)

(52) U.S. Cl.
CPC .............. *B64U 30/10* (2023.01); *B64U 10/25* (2023.01); *B64U 20/80* (2023.01); *B64U 30/294* (2023.01); *B64U 50/13* (2023.01)

(58) Field of Classification Search
CPC ........ B64U 10/25; B64U 20/83; B64U 30/10; B64U 50/13; B64C 27/16
See application file for complete search history.

(56) References Cited

U.S. PATENT DOCUMENTS 3,820,743 A * 6/1974 Young .................... B64C 29/00
244/56
3,915,414 A    10/1975 Shoulders
(Continued)

OTHER PUBLICATIONS

Houghton, James et al., "Fly-by-wire Control of a Monocopter", May 13, 2008, 36 pages.
(Continued)

*Primary Examiner* — Joshua J Michener
*Assistant Examiner* — Michael B. Kreiner

(57) ABSTRACT

There is provided a mono-wing aerial device which includes a housing member having disposed thereon electronic components and a power source, including a controller configured to control a thrust unit; a wing member coupled to the housing member, the wing member configured to produce aerodynamic forces for autorotation of the aerial device, the wing member comprising a first edge portion proximal to the housing member and a second edge portion distal to the housing member, wherein the wing member is coupled to the housing member at the first edge portion; and the thrust unit coupled to the wing member at the second edge portion, wherein the thrust unit is configured to generate thrust in a direction substantially tangential to a rotational plane of the wing member. There is also provided a method of forming the mono-wing aerial device.

16 Claims, 21 Drawing Sheets

(51) Int. Cl.
    *B64U 20/80*  (2023.01)
    *B64U 30/294* (2023.01)
    *B64U 50/13*  (2023.01)

(56) References Cited

U.S. PATENT DOCUMENTS

| | | | | |
|---|---|---|---|---|
| 6,168,379 | B1* | 1/2001 | Bauer | B64C 27/615 244/90 R |
| 7,569,945 | B2* | 8/2009 | Pedersen | F03D 7/0292 290/44 |
| 7,766,274 | B1* | 8/2010 | Jameson | B64C 27/00 244/6 |
| 8,079,546 | B2* | 12/2011 | Barrows | B64D 19/02 102/388 |
| 8,366,055 | B2 | 2/2013 | Ulrich et al. | |
| 8,899,513 | B1 | 12/2014 | Jameson et al. | |
| 9,266,609 | B1* | 2/2016 | Kunz | B64C 29/0008 |
| 2014/0312164 | A1* | 10/2014 | Gibson | B64D 47/08 244/17.11 |
| 2023/0348075 | A1* | 11/2023 | Win | F42B 10/62 |
| 2023/0406551 | A1* | 12/2023 | Dao | B64C 39/024 |

OTHER PUBLICATIONS

Ulrich, Evan R. et al., "Control Model for Robotic Samara: Dynamics about a Coordinated Helical Turn", Journal of Guidance, Control, and Dynamics, vol. 33 No. 6, 2010, Baltimore, MD, USA, pp. 45-50.

Low, Jun En et al., "Analysis of Wing Twist Effects on Hover Flight Dynamics of a Single Rotor Aerial Craft", IEEE International Conference on Advanced Intelligent Mechatronics (AIM), Banff, Alberta, Canada, Jul. 2016, pp. 323-328.

Matič, Gašper et al., "Mathematical Model of a Monocopter Based on Unsteady Blade-Element Momentum Theory", Journal of Aircraft, Sep. 7, 2015, 9 pages.

Pounds, Paul E. I. et al., "Integrated Electro-Aeromechanical Structures for Low-Cost, Self-Deploying Environment Sensors and Disposable UAVs", IEEE International Conference on Robotics and Automation (ICRA), Karlsruhe, Germany, May 2013, pp. 4444-4451.

Mitchell, Jordan et al., "Design of a novel auto-rotating UAV platform for underground mine cavity surveying", Canada, 10 pages.

Varshney, Kapil et al., "The kinematics of falling maple seeds and the initial transition to a helical motion", Nonlinearity, vol. 25, London Mathematical Society, 2012, 9 pages.

Ulrich, Evan R. et al., "From falling to flying: The path to powered flight of a robotic samara nano air vehicle", Bioinspiration & Biomimetics, vol. 5, Nov. 24, 2010, 17 pages.

Win, Shane Kya Hla et al., "Dynamics and Control of a Collaborative and Separating Descent of Samara Autorotating Wings", IEEE Robotics and Automation Letters, vol. 4 No. 3, Jul. 3, 2019, pp. 3067-3074.

Win, Shane Kya Hla et al., "Direction Controlled Descent of Samara Autorotating Wings (SAW) with n-Wings", IEEE International Conference on Robotics and Automation (ICRA), Brisbane, Australia, May 2018, pp. 6553-6559.

Low, Jun En et al., "Towards a Stable Three-Mode Transformable HOvering Rotorcraft (THOR)", IEEE/ASME International Conference on Advanced Intelligent Mechatronics (AIM), Auckland, New Zealand, Jul. 2018, pp. 492-497.

Low, Jun En et al., "Design and Dynamic Analysis of a Transformable HOvering Rotorcraft (THOR)", IEEE International Conference on Robotics and Automation (ICRA), Singapore, 2017, pp. 6389-6396.

Kawasaki, Koji et al., "Dual Connected Bi-Copter with New Wall Trace Locomotion Feasibility That Can Fly at Arbitrary Tilt Angle", IEEE/RSJ International Conference on Intelligent Robots and Systems (IROS), Hamburg, Germany, 2015, pp. 524-531.

Carholt, O. C. et al., "Design, Modelling and Control of a Single Rotor UAV", 24th Mediterranean Conference on Control and Automation (MED), Athens, Greece, Jun. 2016, pp. 840-845.

Zhang, Weixuan et al., "A controllable flying vehicle with a single moving part", IEEE International Conference on Robotics and Automation (ICRA), Stockholm, Sweden, May 2016, pp. 3275-3281.

Piccoli, Matthew et al., "Piccolissimo: The smallest micro aerial vehicle", IEEE International Conference on Robotics and Automation (ICRA), Singapore, 2017, pp. 3328-3333.

Zhang, Jian et al., "Design Optimization and System Integration of Robotic Hummingbird", IEEE International Conference on Robotics and Automation (ICRA), Singapore, 2017, pp. 5422-5428.

Wick, Bradford H., "Study of the subsonic forces and moments on an inclined plate of infinite span", National Advisory Committee for Aeronautics, Washington, Jun. 1954, 26 pages.

Bouabdallah, Samir et al., "Full Control of a Quadrotor", IEEE/RSJ International Conference on Intelligent Robots and Systems, San Diego, CA, USA, 2007, 7 pages.

De Wagter, Christophe et al., "Autonomous Flight of a 20-gram Flapping Wing MAV with a 4-gram Onboard Stereo Vision System", IEEE International Conference on Robotics and Automation (ICRA), May 2014, 8 pages.

Fregene, Kingsley et al., "Dynamics and Control of a Biomimetic Single-Wing Nano Air Vehicle", American Control Conference, Baltimore, MD, USA, 2010, pp. 51-56.

Win, Shane Kyi Hla et al., "The Effects of Chordwise Wing Optimization of Single-Wing Samara in Autorotation", IEEE International Conference on Advanced Intelligent Mechatronics (AIM), Munich, Germany, Jul. 2017, pp. 815-820.

Win, Shane Kyi Hla et al., "Design Optimization of Flap Configuration in Samara Autorotating Wing with Multi-Functional Aerodynamic Structure", IEEE/ASME International Conference on Advanced Intelligent Mechatronics, Hong Kong, China, Jul. 2019, pp. 1359-1364.

Fregene, Kingsley et al., "Autonomous Guidance and Control of a Biomimetic single-wing MAV", dated Dec. 31, 2011, retrieved from http://andrew.cmu.edu/user/jeking/fregene2011samarai.pdf on Feb. 20, 2023.

International Search Report for the corresponding PCT Application No. PCT/SG2021/050399, dated Aug. 20, 2021, 4 pages (for informational purposes only).

\* cited by examiner

TABLE I
TABLE OF OPTIMIZATION VARIABLES

| | Parameter | Lower Bound | Upper Bound |
|---|---|---|---|
| $\Gamma_1$ | $C_1$ | -1 | 1 |
| | $C_2$ | -2 | 2 |
| | $C_3$ | -3 | 3 |
| | $C_4$ | 1 | 100 |
| | $c_{le}$(mm) | 30 | 70 |
| | $dr$(mm) | 15 | 22 |
| | $M_x$(mm) | 0 | 70 |
| | $M_\theta$(deg) | -5 | 30 |
| | $B_y$(mm) | 0 | 30 |
| $\Gamma_2$ | $T_{amp}$(N) | 0.1 | 0.3 |
| | $\epsilon$ | -0.99 | 0.99 |

FIG. 10

TABLE II

TABLE OF SIMULATION PARAMETERS

| PARAMETERS | |
|---|---|
| Environment | $\rho = 1.225 \text{kg/m}^3, g = -9.81 \text{m/s}$ |
| Initial conditions | $V_Z = 0 \text{m/s}, \Omega_Z = -37.7 \text{rad/s}$ |
| Objective fn coeffs | $\kappa_1 = 1000, \kappa_2 = 1, \kappa_3 = 0.1,$ |
|  | $\kappa_4 = 2, \beta_1 = 20, \beta_2 = 0.01$ |
|  | $\beta_3 = 50$ |
| Others | $n_1 = 4000, n_2 = 9999,$ |
|  | $n_3 = 10000, n_4 = 20000$ |
|  | $t_s = 10\text{s}, t_f = 20\text{s}$ |
|  | $n_{bc} = 12, M_{off} = 265\text{mm}, \mu = 2$ |
| OPTIMIZED DESIGN VARIABLES | |
| Polynomial coeffs | $C_1 = -0.0096, C_2 = 0.1116, C_3 = 1.3272,$ |
|  | $C_4 = 44.5336$ |
| Mechanical params | $c_{le} = 70\text{mm}, dr = 17\text{mm}, M_x = 65\text{mm},$ |
|  | $M_\theta = -1°, B_y = 0\text{mm}$ |
| Control params | $T_{amp} = 0.1491\text{N}, \epsilon = 0.0676$ |
| Others | $\gamma = 0.087\text{rad}, m = 101\text{g}$ |
|  | $L_x = 503\text{mm}, L_y = 160\text{mm}, L_z = 82\text{mm}$ |

FIG. 11

MONO-WING AERIAL DEVICE AND METHOD OF FORMING THE MONO-WING AERIAL DEVICE

CROSS-REFERENCE TO RELATED APPLICATION

This is a national phase of PCT-application PCT/SG2021/050399, filed on Jul. 7, 2021, which claims the benefit of priority of Singapore Patent Application No. 10202006551T, filed on 7 Jul. 2020, the content of which being hereby incorporated by reference in its entirety for all purposes.

TECHNICAL FIELD

The present disclosure generally relates to a mono-wing aerial device and a method of forming the mono-wing aerial device.

BACKGROUND

With the growing number of small and underactuated UAV research vehicles, they can be generalized into three distinct categories based on their flight analogy. Vehicles belonging to the first category use one or more aerodynamic surfaces as fundamental lift sources accompanied by propulsion systems. Their examples are micro flying wings and Samara-type rotary-wing vehicles such as monocopters. The second category uses one or more upward-pointing propellers to stay afloat with no additional aerodynamic surfaces. The third category includes of biomimetic soft flapping-wings to achieve flight.

The first category vehicles harness the passive stability and lift generation as a result of rotating its aerodynamic wing-shaped body about its centre of mass somewhat similar to falling of maple seed.

The second category includes vehicles with upward-pointing single or multiple of fixed-pitch propellers with no other aerodynamic lift. The control of vehicle motion is achieved by varying the relative speed or thrust and torque produced by each motor with or without additional thrust vectoring surfaces.

However, the former vehicle requires a good initial condition to hover while the latter does not show robust controllability. Both of the single actuator vehicles are observed to have poor flight efficiency due to the lack of aerodynamic lift apart from propellers.

Flapping robotic vehicles populate the third category. They utilize biomimetic wings to achieve flight. However, their complicated and delicate design with limited airborne time is a significant drawback.

A need therefore exists to provide an aerial device that seeks to overcome, or at least ameliorate, one or more of the deficiencies of conventional aerial devices, and more particularly, providing an improved aerial device, such as having improved control of altitude and trajectory direction. It is against this background that the present disclosure has been developed.

SUMMARY

According to a first aspect of the present disclosure, there is provided a mono-wing aerial device including:
  a housing member having disposed thereon electronic components and a power source, including a controller configured to control a thrust unit;
  a wing member coupled to the housing member, the wing member configured to produce aerodynamic forces for autorotation of the aerial device, the wing member including a first edge portion proximal to the housing member and a second edge portion distal to the housing member, wherein the wing member is coupled to the housing member at the first edge portion; and
  the thrust unit coupled to the wing member at the second edge portion, wherein the thrust unit is configured to generate thrust in a direction substantially tangential to a rotational plane of the wing member.

According to a second aspect of the present disclosure, there is provided a method of forming a mono-wing aerial device, the method including:
  providing a housing member having disposed thereon electronic components and a power source, including a controller configured to control a thrust unit;
  coupling a wing member to the housing member, the wing member configured to produce aerodynamic forces for autorotation of the aerial device, the wing member including a first edge portion proximal to the housing member and a second edge portion distal to the housing member, wherein the wing member is coupled to the housing member at the first edge portion; and
  coupling the thrust unit to the wing member at the second edge portion, wherein the thrust unit is configured to generate thrust in a direction substantially tangential to a rotational plane of the wing member.

BRIEF DESCRIPTION OF THE DRAWINGS

Embodiments of the present disclosure will be better understood and readily apparent to one of ordinary skill in the art from the following written description, by way of example only, and in conjunction with the drawings, in which:

FIG. 10 shows a table illustrating optimization variables according to various example embodiments;

FIG. 11 shows a table illustrating simulation parameters according to various example embodiments;

DETAILED DESCRIPTION

Various embodiments of the present disclosure provide a mono-wing aerial device, and a method of forming the mono-wing aerial device.

Figure 1:
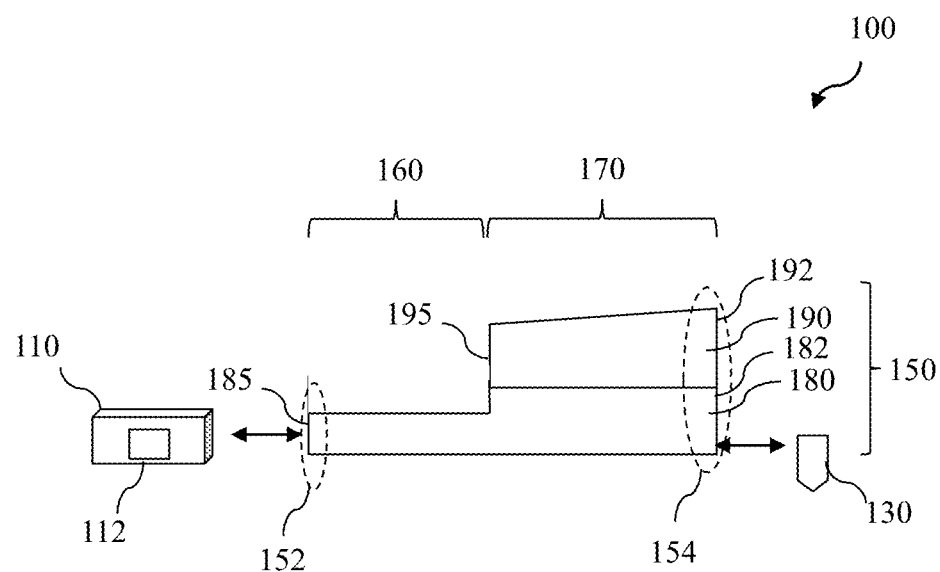
FIG. 1 depicts a schematic drawing of a mono-wing aerial device according to various embodiments of the present disclosure.

FIG. 1 depicts a schematic drawing of a mono-wing aerial device 100 (which may also be herein interchangeably referred to as a monocopter or simply as a wing or wing device) according to various embodiments of the present disclosure. The mono-wing aerial device 100 includes: a housing member 110 having disposed (e.g., arranged or affixed) thereon electronic components and a power source (e.g., a battery), including a controller 112 configured to control a thrust (or thruster) unit 130; a wing member 150 coupled to the housing member, the wing member 150 configured to produce aerodynamic forces for autorotation of the aerial device, the wing member including a first edge portion 152 proximal to the housing member and a second edge portion 154 distal to the housing member, wherein the wing member is coupled to the housing member at the first edge portion 152; and the thrust unit 130 coupled to the wing member at the second edge portion 154, wherein the thrust unit 130 is configured to generate thrust in a direction substantially tangential to a rotational plane of the wing member. Accordingly, the mono-wing aerial device may be a rotating platform having the thrust unit 130 configured to generate thrust in a direction substantially tangential to a rotational plane of the wing member which may advantageously have improved control of altitude and trajectory direction, such as facilitating rotation as well as upward direction. The mono-wing aerial device may use the thrust unit for its multi-directional trajectory control. The thrust unit may be used to control both altitude and direction of the mono-wing aerial device. For example, the mono-wing aerial device uses a single thruster unit for multi-directional control, instead of an actuating flap, for the mono-wing aerial device. The thrust unit provides a more focused and precise application of aerodynamic force and torque under a control input.

In various embodiments, the wing member 150 may be a light-weight wing structure that creates the aerodynamic lift and torque required to initiate and sustain autorotation.

In various embodiments, the mono-wing aerial device 100 may be single-actuator system. According to various embodiments, the mono-wing aerial device uses a single thrust unit, as an alternative to a flap in conventional devices, for its multi-directional trajectory control. Accordingly, the mono-wing aerial device 100 may include a single thrust unit 130 (e.g., single motor) which is coupled to the wing member 150 at the second edge portion 154. In other words, only one thrust unit 130 is used for the mono-wing aerial device 100 and coupled to the wing member 150. The mono-wing aerial device 100 therefore has less power consumption compared to conventional aerial devices. Accordingly, the mono-wing aerial device 100 is provided with a single thrust unit 130 coupled to the wing member 150 at the second edge portion 154, and without any actuator coupled at other portions of the wing member 150. The mono-wing aerial device 100 advantageously saves weight, is less complex to form/assemble, and is reliable.

In various embodiments, the wing member 150 includes an inner wing region 160 having the first edge portion 152 and an outer wing region 170 having the second edge portion 154. In various embodiments, the wing member 150 further includes a leading portion 180 and a trailing portion 190 in the outer wing region 170, the trailing portion 190 being arranged along a length of the leading portion 180 in the outer wing region 170. The leading portion 180 and the trailing portion 190 may be used to optimize the overall weight distribution and autorotation of the wing member 150.

In various embodiments, the leading portion 180 and the trailing portion 190 may be formed of a different material. For example, the leading portion 180 and the trailing portion 190 may be assembled together to form the wing member 150. For example, the leading portion 180 may be formed of wood and the trailing portion 190 may be formed of a solid foam material. In various other embodiments, the leading portion 180 and the trailing portion 190 may be formed of the same material and/or may be integral. In other words, the wing member 150 may be formed of a single component. For example, the wing member 150 may be formed of a single type of material. For example, the wing member 150 may be formed of wood.

In various embodiments, the trailing portion 190 is non-adjustable with respect to the leading portion 180. In other words, the trailing portion 190 may be formed with a fixed angle with respect to the leading portion 180.

In various embodiments, the second edge portion 154 includes a first side 182 of the leading portion distal to the housing member and a first side 192 of the trailing portion distal to the housing member, and the thrust unit 130 is connected to the first side 182 of the leading portion distal to the housing member.

In various embodiments, the leading portion includes a second side 185 proximal to the housing member, and the trailing portion includes a second side 195 proximal to the housing member, and the second side 195 of the trailing portion being offset from the second side 185 of the leading portion by a predetermined distance.

In various embodiments, the leading portion and the trailing portion are each a flat plate airfoil.

In various embodiments, the two-dimensional (2D) wing design and motor control strategy of the mono-wing aerial device enable a passively stable and efficient flight without needing a mechanical flap for lateral control.

In various embodiments, the controller is configured to control the thrust unit to generate the thrust based on a square cyclic control.

In various embodiments, the square cyclic control includes a first parameter relating to offset thrust and a second parameter relating to amplitude of a square wave.

In various embodiments, the thrust unit includes a motor and a propeller.

In various embodiments, the housing member is a printed circuit board.

In various embodiments, the housing member 110 further includes a memory, and the controller 112 is communicatively coupled to the memory and configured to control the thrust unit to generate the thrust in the direction substantially tangential to the rotational plane of the wing member.

Accordingly, various embodiments provide a mono-wing aerial device or monocopter having a single motor, a printed circuit board, and a 2D planform wing in contrast to conventional monocopters which typically have two actuators and rather complex wing designs. By using Genetic Algorithm, wing and motor configuration parameters are optimized for the following goals: optimal motor configurations and minimal oscillations for passively stable hovering of the selected hardware. Although being a highly under-actuated system, the mono-wing aerial device according to various embodiments is sufficiently robust to achieve controlled translations in five degrees of freedom (DOF) and designed to be passively stable even when the controller is turned off. According to various embodiments, by eliminating a high-speed flap servo, a significant amount of weight can be reduced and power is conserved. The mono-wing aerial device has longer flight endurance and stability compared to conventional Micro Aerial or Single Actuator platforms. Further, the mono-wing aerial device includes passive autorotation capability. Therefore, the mono-wing aerial device may be very safe and impossible to crash even in the event of a power failure or loss of propeller. Using the passive autorotation capability, the mono-wing aerial device may conserve power on descent. The descent may also be delayed with the help of the on-board thruster unit (e.g., when active). The mono-wing aerial device may be used, for example, for aerial deployment of miniature or lightweight sensors or payloads.

Figure 2:
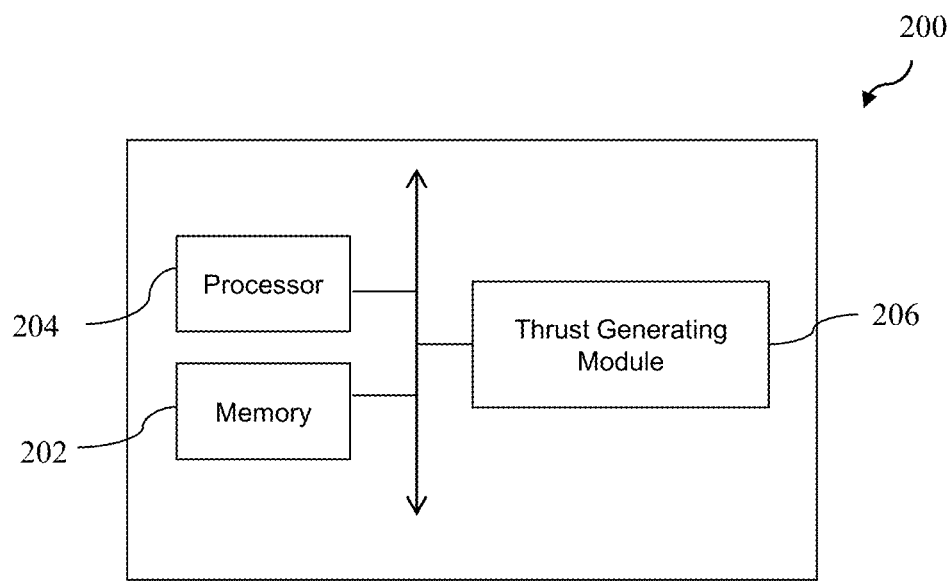
FIG. 2 depicts a schematic block diagram of a system for controlling the mono-wing aerial device according to various embodiments.

FIG. 2 depicts a schematic block diagram of a system 200 for controlling the mono-wing aerial device based on thrust generated according to various embodiments, such as by the thrust unit 130 of the mono-wing aerial device 100 as described hereinbefore with reference to FIG. 1 according to various embodiments. The system 200 includes a memory 202, and a processor 204 (e.g., corresponding to the controller as described hereinbefore) communicatively coupled to the memory 202 and configured to: control the thrust unit, as described hereinbefore with reference to FIG. 1 according to various embodiments.

It will be appreciated by a person skilled in the art that the processor may be configured to perform the required functions or operations through set(s) of instructions (e.g., software module(s)) executable by the processor 204 to perform the required functions or operations. Accordingly, as shown in FIG. 2, the system 200 may include a thrust generating module (or a thrust generating circuit) 206 configured to: control the thrust unit to generate the thrust in a direction substantially tangential to a rotational plane of the wing member, as described hereinbefore with reference to FIG. 1 according to various first embodiments.

It will be appreciated by a person skilled in the art that the above-mentioned module may be realized by or implemented as one functional module (e.g., a circuit or a software program) as desired or as appropriate. For example, the thrust generating module 206 may be realized as an executable software program (e.g., software application or simply referred to as an "app"), which for example may be stored in the memory 202 and executable by the processor 204 to perform the functions/operations as described herein according to various embodiments.

For example, in various embodiments, the memory 202 may have stored therein the thrust generating module 206 as described hereinbefore according to various embodiments, which are executable by the processor 204 to perform the corresponding functions/operations as described herein.

A computing system, a controller (e.g., microcontroller) or any other system providing a processing capability may be provided according to various embodiments in the present disclosure. For example, the system 200 described hereinbefore may include a processor (or controller) 204 and a computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present disclosure and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "determining", "optimizing", "obtaining", "controlling", or the like, refer to the actions and processes of a computer system, or similar electronic device, that manipulates and transforms data represented as physical quantities within the computer system into other data similarly represented as physical quantities within the computer system or other information storage.

The present specification also discloses a system (e.g., which may also be embodied as a device or an apparatus) for performing the operations/functions of various steps of methods described herein. Such a system may be specially constructed for the required purposes.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure. For example, it will be appreciated by a person skilled in the art that the thrust generating module 206 may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a computer processor. The computer program when loaded and executed on such a computer processor effectively results in an apparatus or device that implements one or more steps of the methods described herein.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 3:
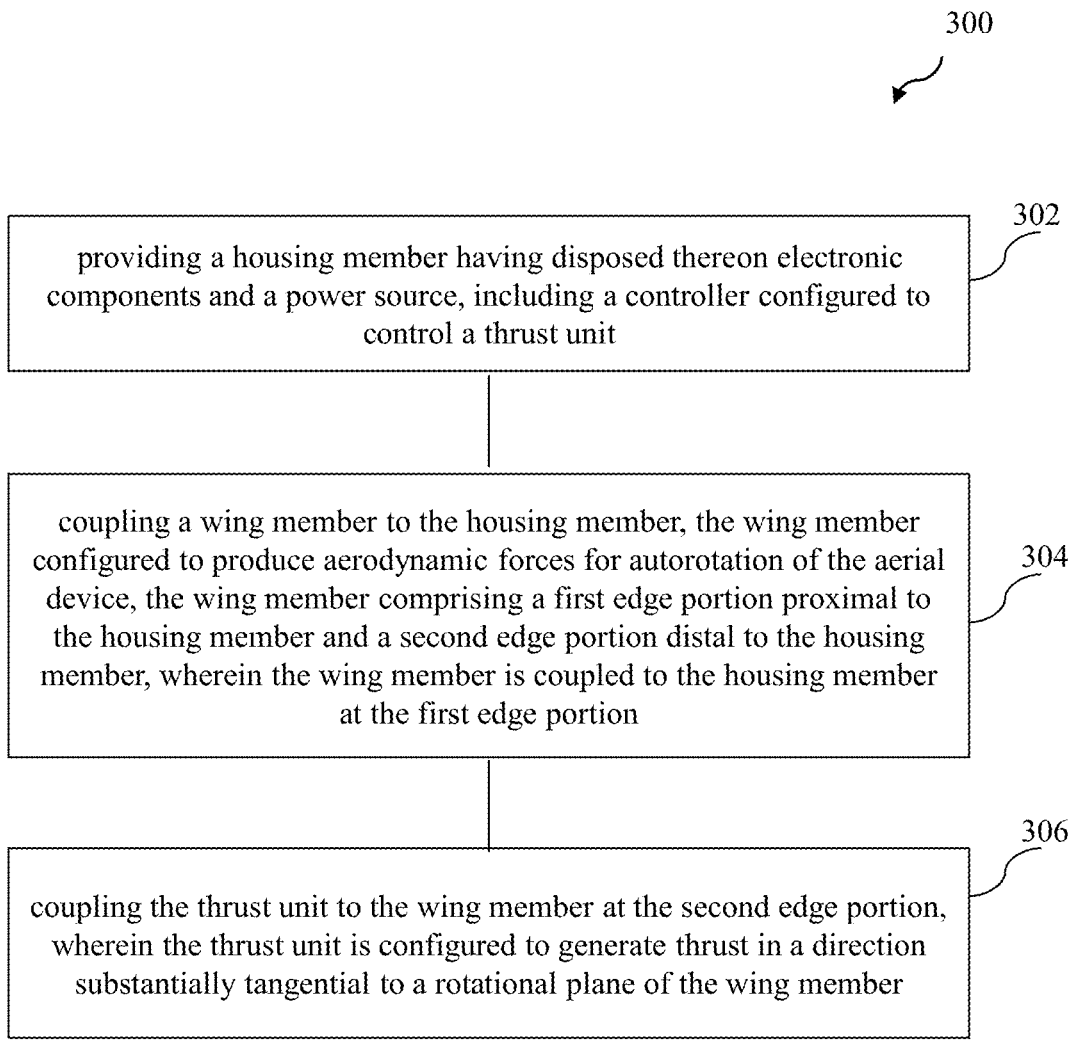
FIG. 3 depicts a schematic flow diagram of a method of forming a mono-wing aerial device, such as the mono-wing aerial device as described herein with reference to FIG. 1 according to various embodiments.

FIG. 3 depicts a schematic flow diagram of a method 300 of forming a mono-wing aerial device, such as the mono-wing aerial device 100 as described herein with reference to FIG. 1. The method 300 includes: providing (at 302) a housing member having disposed thereon electronic components and a power source, including a controller configured to control a thrust unit; coupling (at 304) a wing member to the housing member, the wing member configured to produce aerodynamic forces for autorotation of the aerial device, the wing member including a first edge portion proximal to the housing member and a second edge portion distal to the housing member, wherein the wing member is coupled to the housing member at the first edge portion; and coupling (at 306) the thrust unit to the wing member at the second edge portion, wherein the thrust unit is configured to generate thrust in a direction substantially tangential to a rotational plane of the wing member.

In various embodiments, the method 300 is for forming the mono-wing aerial device 100 as described hereinbefore with reference to FIG. 1, therefore, the method 300 may further include various steps corresponding to providing or forming various configurations and/or components/elements of the mono-wing aerial device 100 as described herein according to various embodiments, and thus such corresponding steps need not be repeated with respect to the method 300 for clarity and conciseness. In other words, various embodiments described herein in context of the mono-wing aerial device 100 is analogously or correspondingly valid for the method 300 (e.g., for forming the mono-wing aerial device 100 having various configurations and/or components/elements as described herein according to various embodiments), and vice versa.

In various embodiments, a planform the wing member and a location and orientation of the thrust unit at the second edge portion of the wing member is configured based on a first multi-component objective optimization function including a plurality of components for minimum thrust and minimum undesired oscillations at hover state using genetic algorithm.

In various embodiments, the plurality of components of the first multi-component objective optimization function include a first component relating to an average thrust at hover, a second component relating to average rotation speed, a third component relating to oscillations in a hover state, and a fourth component relating to a penalty function for undesired oscillations.

In various embodiments, the planform the wing member and the location and orientation of the thrust unit at the second edge portion of the wing member is configured based on a second multi-component objective optimization function including a plurality of components relating to square cyclic control using the genetic algorithm.

In various embodiments, the plurality of components of the second multi-component objective optimization function include a fifth component relating to distance travelled under square cyclic command, a sixth component relating to fluctuating height of the mono-wing aerial device under the square cyclic command, a seventh component relating to a penalty function for undesired oscillations.

In various embodiments, the method 300 further includes forming the wing member which includes an inner wing region having the first edge portion and an outer wing region having the second edge portion. In various embodiments, forming the wing member includes forming a leading portion and a trailing portion in the outer wing region, the trailing portion being arranged along a length of the leading portion in the outer wing region.

In various embodiments, the second edge portion includes a first side of the leading portion distal to the housing member and a first side of the trailing portion distal to the housing member, and the thrust unit is connected to the first side of the leading portion distal to the housing member.

In various embodiments, the trailing portion includes a second side proximal to the housing member, the second side being offset from the housing member by a predetermined distance.

It will be appreciated by a person skilled in the art that various steps of the method 300 presented in FIG. 3 may be performed concurrently or simultaneously, rather than sequentially, as appropriate or as desired.

It will be appreciated by a person skilled in the art that the terminology used herein is for the purpose of describing various embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

In order that the present disclosure may be readily understood and put into practical effect, various example embodiments of the present disclosure will be described hereinafter by way of examples only and not limitations. It will be appreciated by a person skilled in the art that the present disclosure may, however, be embodied in various different forms or configurations and should not be construed as limited to the example embodiments set forth hereinafter. Rather, these example embodiments are provided so that this disclosure will be thorough and complete, and will fully convey the scope of the present disclosure to those skilled in the art.

Various example embodiments provide a mono-wing aerial device (which may be interchangeably be referred to herein as a Single Actuator Monocopter (SAM), monocopter or simply wing device) and method to overcome shortcomings in conventional aerial devices.

Various example embodiments provide a mechanically simple and passively stable monocopter that is designed to achieve efficient, stable, controlled flight among single actuator type vehicles.

Biomimetic designs have been around to solve various kinds of modern-day challenges. Traditional method of payload deployment systems uses less reliable parachute systems which are usually large and less compact. The samara inspired UAV design is introduced to tackle with small and light weight guided payload problems. This system is compact, reliable and mission oriented for higher success rate. The mono-wing aerial device according to various example embodiments shares similarities and traits over the Samara Autorotating Wing (SAW), as described in S. K. H. Win, L. S. T. Win, D. Sufiyan, G. S. Soh and S. Foong, "Dynamics and control of a collaborative and separating descent of samara autorotating wings," IEEE Robotics and Automation Letters, Vol 4(3), 3067-3074, 2019, for light-weight aerial payload deployment. SAW is an unpowered autorotation device which rely on its rather huge flap for its directional controlled descent. It has no thruster therefore it cannot fly up, rather glide down. The mono-wing aerial device according to various example embodiments uses a single thruster unit instead of a flap servo. The mechanical structure and physical dynamics closely resemble that of a samara seed. The body (corresponding to the housing member described hereinbefore) is the dense portion where the battery and electronics are located while a light-weight wing structure (corresponding to the wing member described hereinbefore) generates aerodynamic lift. Therefore, the mono-wing aerial device according to various example embodiments may fly like a monocopter and autorotate like a SAW.

According to various example embodiments, a vehicle design that has increased reliability, maximized functionality and optimized for hover efficiency is provided using a simple flat airfoil (corresponding to the wing member as described hereinbefore). The motor location and wing shape for SAM may be calculated using genetic algorithm (GA) for optimal hover thrust. According to various example embodiments, a square cyclic motor control strategy is demonstrated. Based on the results of the genetic algorithm, a physical device of the aerial device according to various example embodiments was verified in a laboratory setup under OptiTrack system. In various example embodiments, the Square Cyclic Control Strategy was tested using a closed-loop PID control in an OptiTrack environment, where SAM demonstrated a stable figure-eight flight trajectory with minimal oscillation. In various example embodiments, the device may consume an average of about 25 W in hover.

Design Consideration

Like a paper airplane that can be easily built and achieve consistent flight every time, SAM's design goal is to create the simplest, stable and easy to assemble platform. According to various example embodiments, a single printed circuit board (PCB) body may be used. Existing monocopters come in various complex shapes and forms; most of them require flybars or arms with distributed components to achieve stability. Unlike conventional monocopters, the mono-wing aerial device according to various example embodiments may be a simple vehicle that resembles nature's maple seed in design as shown in FIGS. 4A-4D. The mono-wing aerial device may include a housing member which may regarded as a seed-like dense portion, a main leading-edge, a lighter trailing-edge and a motor (e.g., a tiny motor). The single motor may be optimally placed for attitude control of the aerial device whereby its control strategy is discussed below. Furthermore, SAM can take off and land on a relatively flat surface.

Figure 4A:
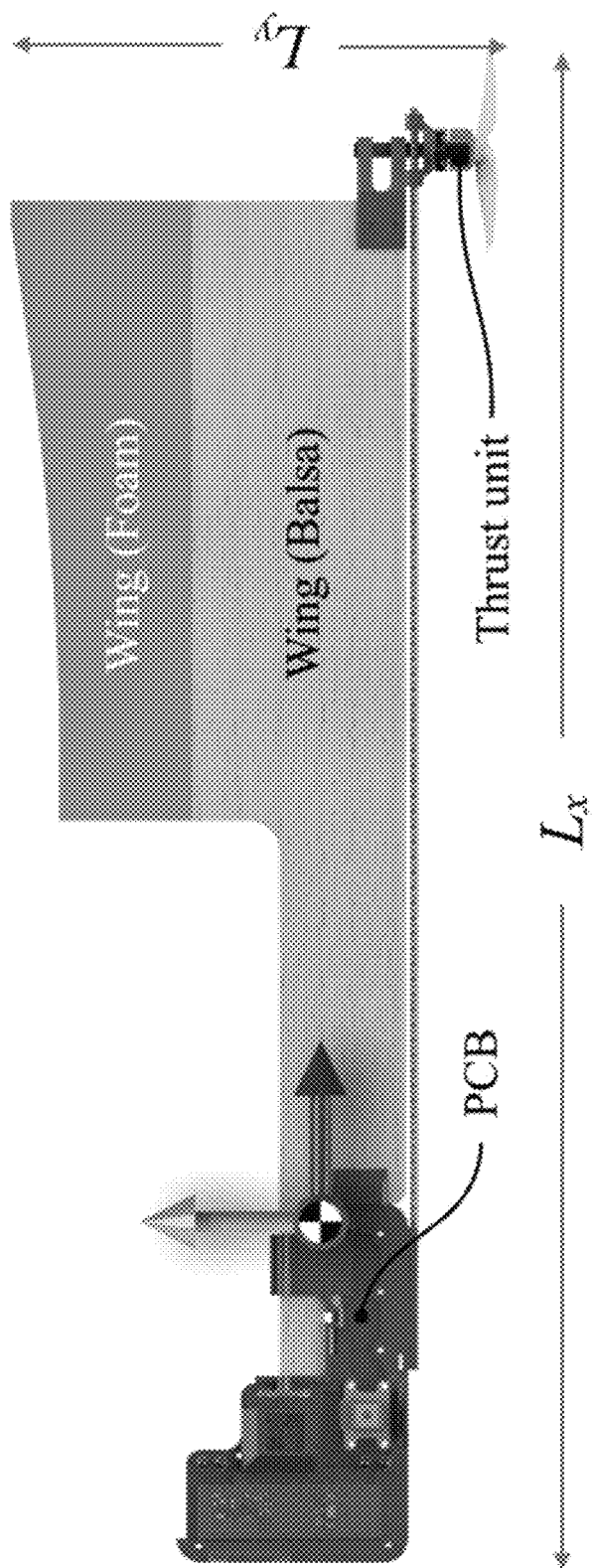
FIGS. 4A-4C illustrate top, side and front views of the aerial device according to various example embodiments.
Figure 4B:
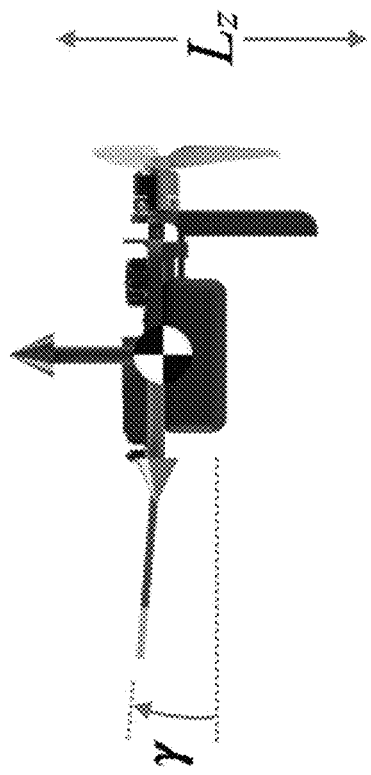
Figure 4C:
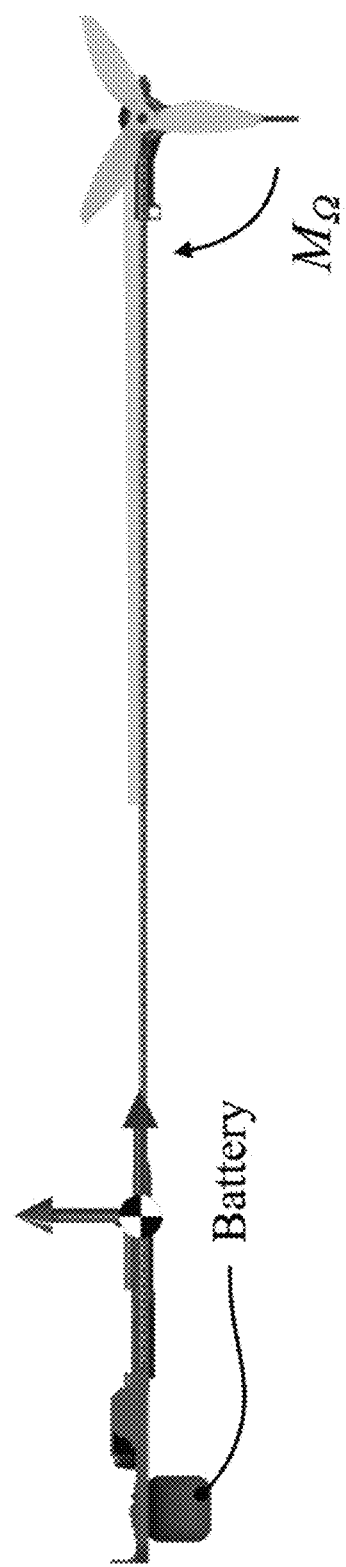
Figure 4D:
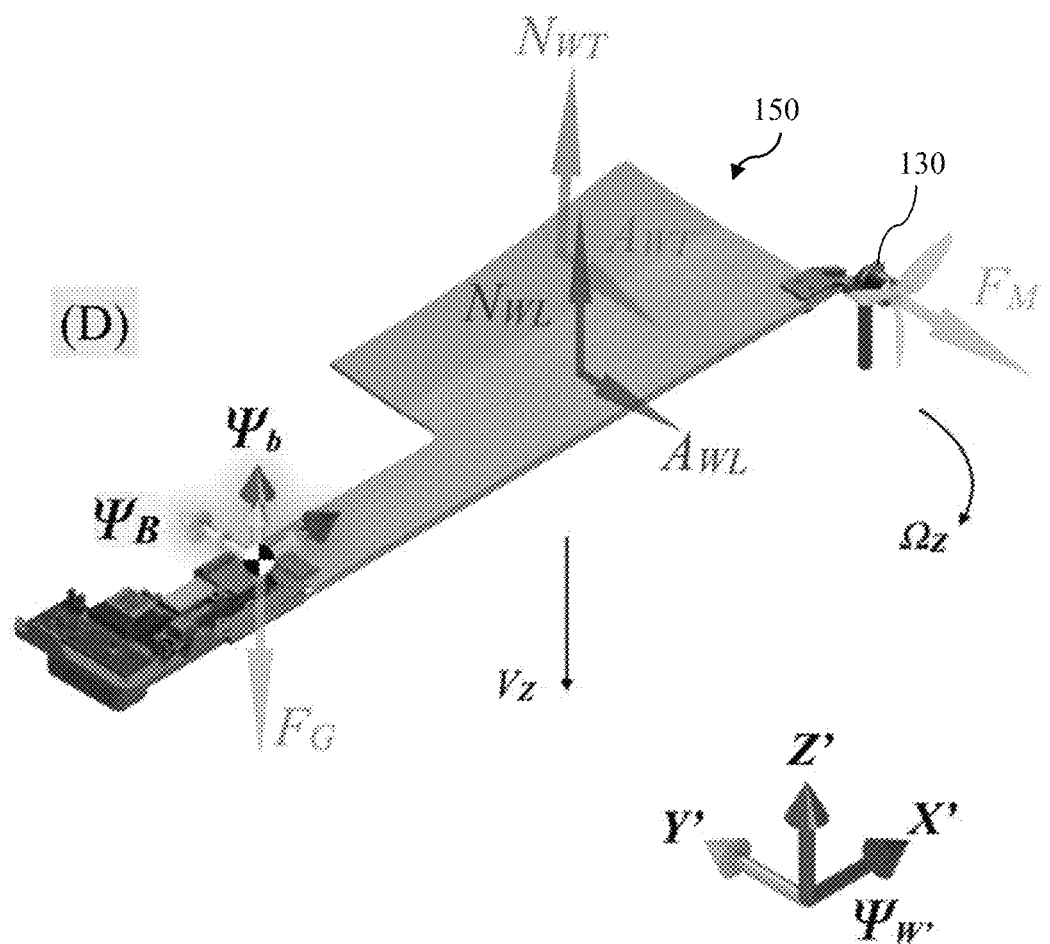
FIG. 4D illustrates a free body diagram with definitions of world frame, a body frame at the center of gravity and a non-rotating body frame, according to various example embodiments.

More particularly, FIGS. 4A-4C illustrate top, side and front views of the mono-wing aerial device according to various example embodiments. FIG. 4D illustrates a free body diagram with definitions of world frame $\Psi_{W'}$ (X', Y', Z'), body frame $\Psi_b$ (x, y, z) at the center of gravity and a non-rotating body frame $\Psi_B$ (X, Y, Z) whose origin is at center of gravity with its axes aligned to $\Psi_{W'}$. Rotation speed $\Omega_Z$ is measured about $\Psi_B$ and drop speed $V_Z$ is measured with respect to $\Psi_{W'}$. The direction of propeller is denoted by $M_\Omega$. Lengths $L_x$, $L_y$, $L_z$, wing trailing edge angle $\gamma$ and mass m of final optimized SAM are given in Table II. $F_M$ denotes the force or thrust generated by the motor (thrust unit 130). According to various example embodiments, the direction of thrust generated by the motor is tangential to the (horizontal) rotational plane of the wing member 150. The thrust generated according to various embodiments may aid in rotation as well as upward direction of the mono-wing aerial device, unlike conventional devices in which direction of thrust generated by motor is facing near vertical to the rotational plane. Also, directly due to the placement of the motor, the generated force results in tilting of rotation plane, which does not help in rotation speed unlike various embodiments of the disclosure.

Dynamic Model

According to various example embodiments, Blade Element Theory, as described in J. Zhang, F. Fei, Z. Tu and X. Deng, "Design optimization and system integration of robotic hummingbird," 2017 IEEE International Conference on Robotics and Automation (ICRA), Singapore, 2017, pp. 5422-5428, may be applied to model the flight of SAM in a 6 degrees-of-freedom environment. The world frame is denoted as $\Psi_{W'}$ and the body frame is denoted as $\Psi_b$. A non-rotating body frame $\Psi_B$ is also defined whereby its axes are always aligned to that of $\Psi_W$, shown in FIG. 4D. The wing may be composed of two sections or portions, the front and the rear, both of which are flat plate airfoils. The wing sections (i.e., the front portion and the rear portion) may be each split into $n_{be}$ blade elements. The lift and drag forces generated from each blade element may be calculated using:

$$dL = \frac{1}{2}\rho U^2 c C_l dr \qquad \text{Equation (1)}$$

$$dD = \frac{1}{2}\rho U^2 c C_D dr \qquad \text{Equation (2)}$$

where dL and dD are the lift and drag forces respectively acting on the blade element, ρ is the density of air, U is the relative air velocity interacting with the blade element, c is the chord length of the blade element, $C_l$ and $C_D$ are coefficients of lift and drag respectively, and dr is the width of the blade element.

As the wing is constantly flying into its own wake during hover and in most aspects of the flight, it is assumed to be less efficient than in its ideal state. To account for this, the drag coefficients are multiplied with a constant μ such that $C_D = \mu C_d$. This value of μ is experimentally found by flying an arbitrary configuration of SAM and then fine-tuning the simulated parameters to match the results. The values of $C_l$ and $C_d$ may be obtained and linearly interpolated from B. H. Wick, "Study of the subsonic forces and moments on an inclined plate of infinite span," National Advisory Committee Aeronaut, Technical Report TN-3221, 1954.

Figure 5:
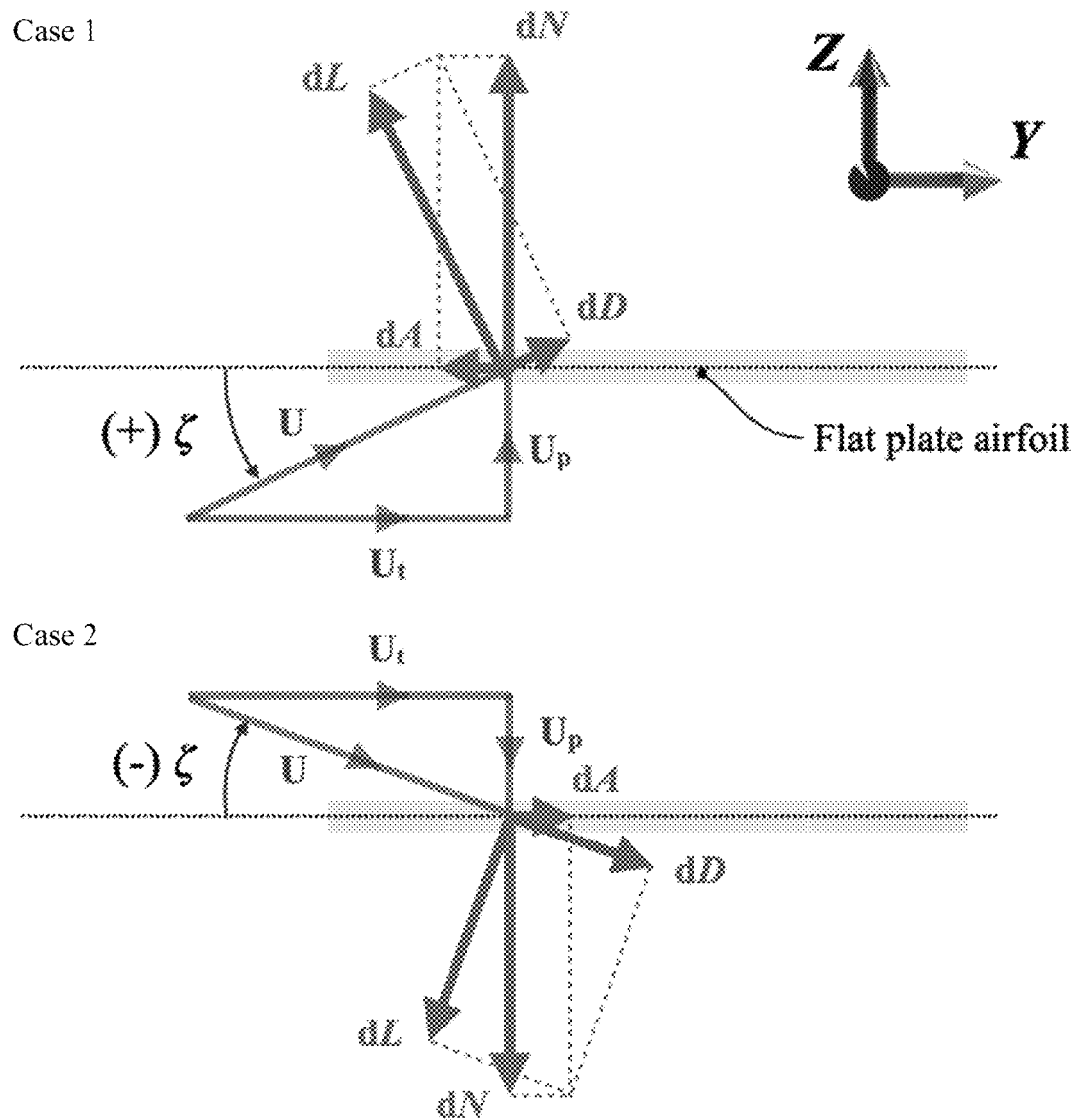
FIG. 5 shows two cases of relative inflow angle for blade element, according to various example embodiments.

According to various example embodiments, the lift and drag forces dL and dD may be resolved into normal and axial forces (dN and dA respectively) before being applied back into the simulated dynamic model. In MATLAB Simulink, the relative inflow angle can be found by attaching a transform sensor to measure velocities with respect to a non-rotating follower on the blade element, as shown in FIG. 5. More particularly, FIG. 5 shows two cases of relative inflow angle ζ for blade element. The two cases consider all inflow velocity situations, allowing the model to be simulated in almost any scenario.

The normal force dN and the axial force dA may be then calculated using:

$$\text{Case 1} \begin{cases} dN = dL\cos(\zeta) + dD\sin(\zeta) \\ dA = -dL\sin(\zeta) + dD\cos(\zeta) \end{cases} \qquad \text{Equation (3)}$$

$$\text{Case 2} \begin{cases} dN = -dL\cos(\zeta) + dD\sin(\zeta) \\ dA = dL\sin(\zeta) + dD\cos(\zeta) \end{cases} \qquad \text{Equation (4)}$$

where ζ is the relative inflow angle of air.

Figure 6A:
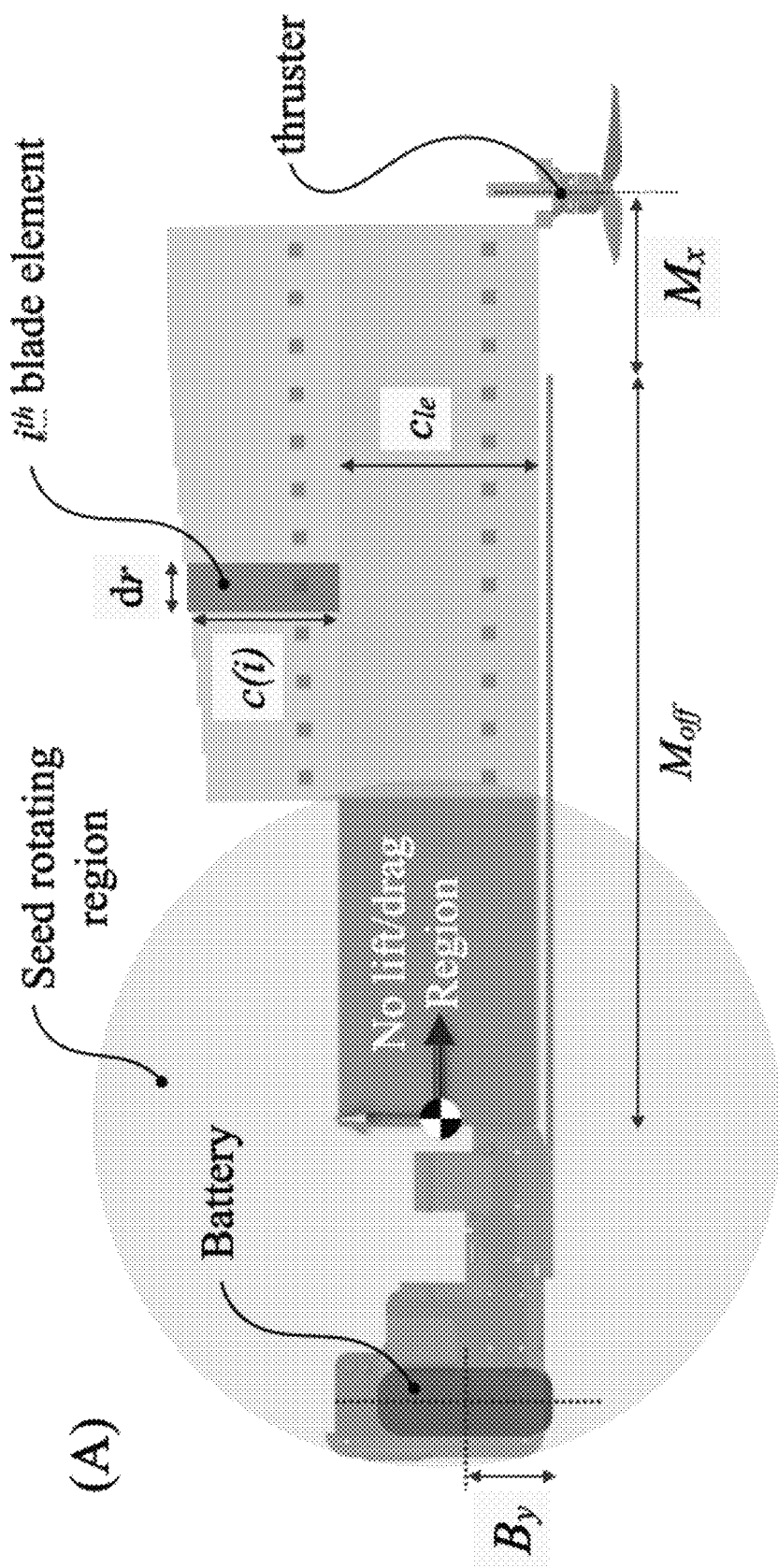
FIG. 6A shows a top view of a simulated model, depicting a blade element designation and variables for optimization according to various example embodiments.

Through numerous experimental testing, it is found that the inner region of the wing which overlaps with the seed portion (corresponding to the housing member) does not create useful lift. Flight times are recorded by flying with a full wing and with a reduced chord-length of the inner wing portion. Similar flight times were observed for both configurations. This may be due to the turbulent wake from the seed portion and battery, rendering the inner wing portion useless. The blade elements in the simulation model are therefore placed only after the inner wing portion, as shown in FIG. 6A. The blade elements are uniformly distributed along the outer wing to calculate the total aerodynamic force and torque generated. The resultant forces may be assumed to be applied at the quarter-chord position.

The outer wing may be separated into a leading edge (corresponding to the leading portion as described hereinbefore) and a trailing edge (corresponding to the trailing portion as described hereinbefore). According to various example embodiments, to keep the optimization problem simple, the leading edge may be kept as straight rectangular planform, while the trailing edge is considered for shape optimization. The leading edge is rectangular in shape whose length and width are defined by cumulative width of blade element dr and leading edge chord length $c_{le}$. The planform of the trailing edge may be more flexible and is defined by a polynomial of order 3 to ensure smoothness of the shape. The chord lengths of the blade elements of the trailing edge can be defined as follows:

$$c(i) = C_1 i^3 + C_2 i^2 + C_3 i + C_4, c_{min} \leq c(i) \leq c_{max} \qquad \text{Equation (5)}$$

where i is the blade element designation ($i \leq n_{be} | i \in \mathbb{Z}^+$), c(i) is the chord length of the respective blade element, and $C_1$, $C_2$, $C_3$ and $C_4$ are the coefficients to be determined such that the value of c(i) is bounded between $c_{min}$ and $c_{max}$.

More particularly, FIG. 6A shows a top view of a simulated model SAM, depicting a blade element designation and variables for optimization ($c_{le}$, dr, $M_x$, $B_y$). c(i) is chord length of trailing edge of wing, defined in Equation (5). $c_{le}$ and dr are leading edge chord length and blade element width respectively. $M_x$ is the location of motor along x axis. More particularly, $M_x$ is the 'variable' minor adjustment of motor location that the optimization searches for. $M_{off}$ denote a 'fixed' default offset distance from center of gravity to the location of motor. Example values of $M_x$ and $M_{off}$ are given in Table II in FIG. 11. $B_y$ defines the location of battery along they axis. It also shows the region where the seed portion rotates within and the resulting portion of the wing incapable of creating aerodynamic forces and hence not included in blade element calculations.

Figure 6B:
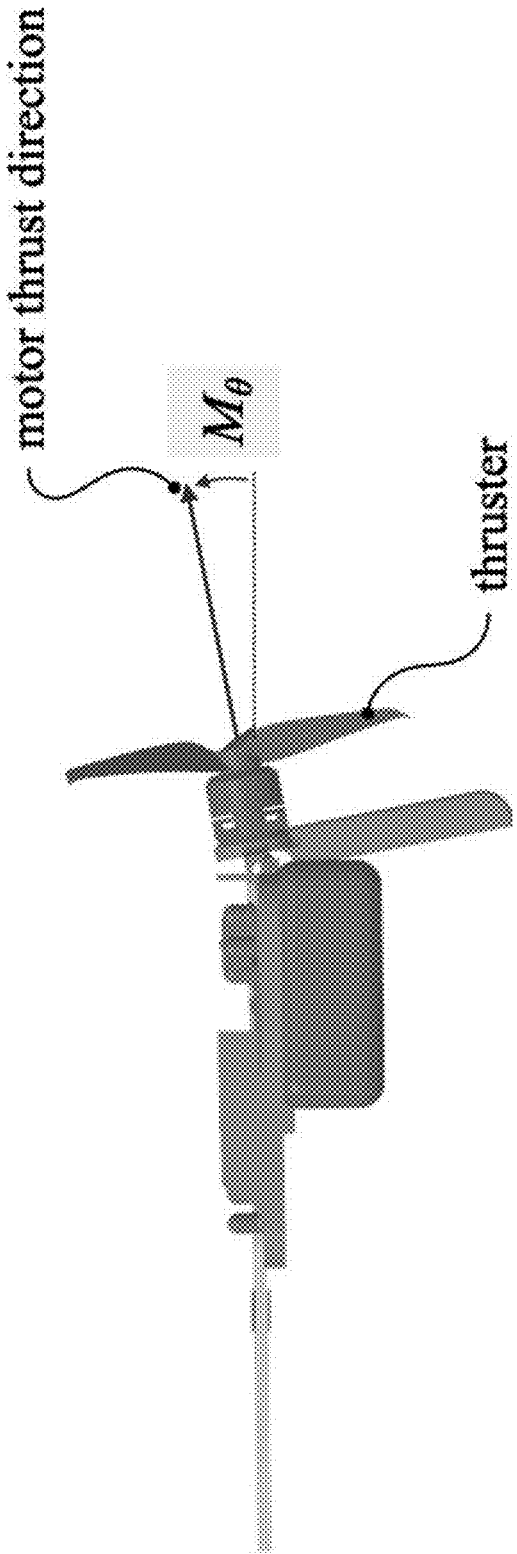
FIG. 6B illustrates a side view showing definition of variable which is the angle of motor thrust measured from the horizontal according to various example embodiments.

FIG. 6B illustrates a side view showing definition of variable $M_\theta$, which is the angle of motor thrust measured from the horizontal.

According to various example embodiments, the thrust unit may include a brushless motor directly attached to a propeller. In order to consider the gyroscopic effects of a spinning mass (the motor bell and propeller), the components are also spun in the simulation with estimated rotation speed of 400 rotations per second at 100 g of thrust, modelled with a direct linear relationship to the motor force.

The accuracy of the simulated model is cross-checked with an actual physical device during mid-design phase, on parameters such as the rotation speed $\Omega_z$ and the thrust T required for hover. It is found that the accuracy is highly increased by assuming the motor thrust is only 60% efficient.

Figure 7A:
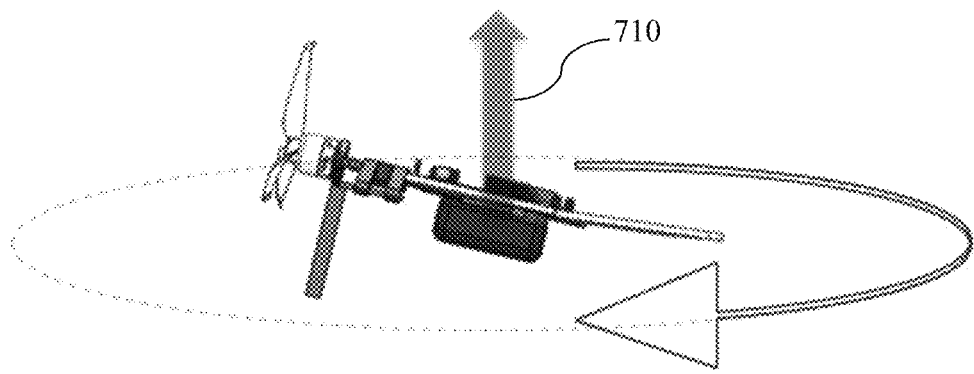
FIG. 7A shows a side view of the mono-wing aerial device according to various example embodiments during hover or ascend state.

FIG. 7A shows a side view of the mono-wing aerial device according to various example embodiments during hover state or flight. As it spins upward, gyroscopic effect on the spinning mass at wing tip coupling with spinning body (mono-wing aerial device) creates a clockwise rotational torque on the body. The trailing portion may function as a drag plate which generates counter-clockwise torque effect on the body as well. The arrow 710 shows the direction of flight. The mono-wing aerial device may hover and fly upwards. FIG. 7A illustrates the posture of the mono-wing aerial device in the hover or ascend state. The parameters are optimized in the MATLAB GA function for the best stability. The result is a passively stable platform which does not require an adjustable flap servo in any flight mode.

Figure 7B:
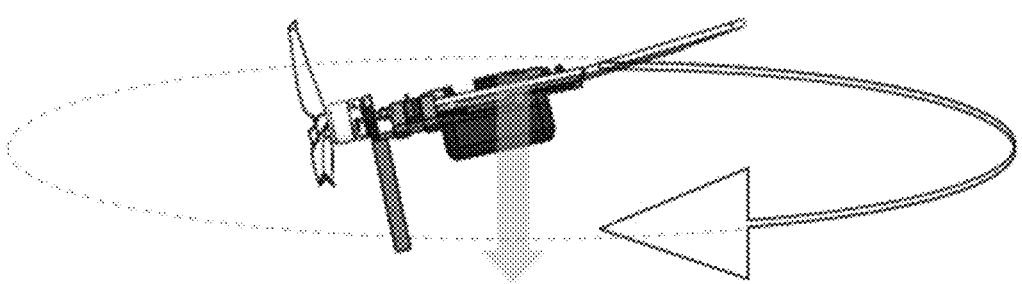
FIG. 7B shows a side view of the mono-wing aerial device according to various example embodiments during autorotation state.

FIG. 7B shows a side view of the mono-wing aerial device according to various example embodiments during autorotation state. More particularly, 7B shows a side view of the mono-wing aerial device during autorotation descent. Absent of motor torque changes the overall posture of the craft or mono-wing aerial device. The craft pitches down as the drag is apparently greater until it reaches equilibrium. As a result, the craft enters natural autorotation. The optimized flap angle not only complement during hover but also for sustaining the autorotation state. FIG. 4B illustrates the flap angle. The flap angle may be an angle of the trailing edge with respect to a horizontal plane. For example, the flap angle may be a fixed angle of the trailing portion with respect to the leading portion.

Square Cyclic Control

According to various example embodiments, the single actuator on SAM is used for both altitude and attitude (e.g., roll and pitch control authority of the device) control simultaneously. As SAM is a constantly rotating system, a cyclic control may be applied. In helicopters, a swash plate is used to obtain a cyclic control of the blade pitch angle. The swash plate mechanically limits and controls the pitch angle of each blade, producing a smooth sine wave through each rotation. The result gradually increases and decreases lift over different regions within each rotation. The imbalance of lift tilts the craft into a pitch or roll motion.

Figure 8A:
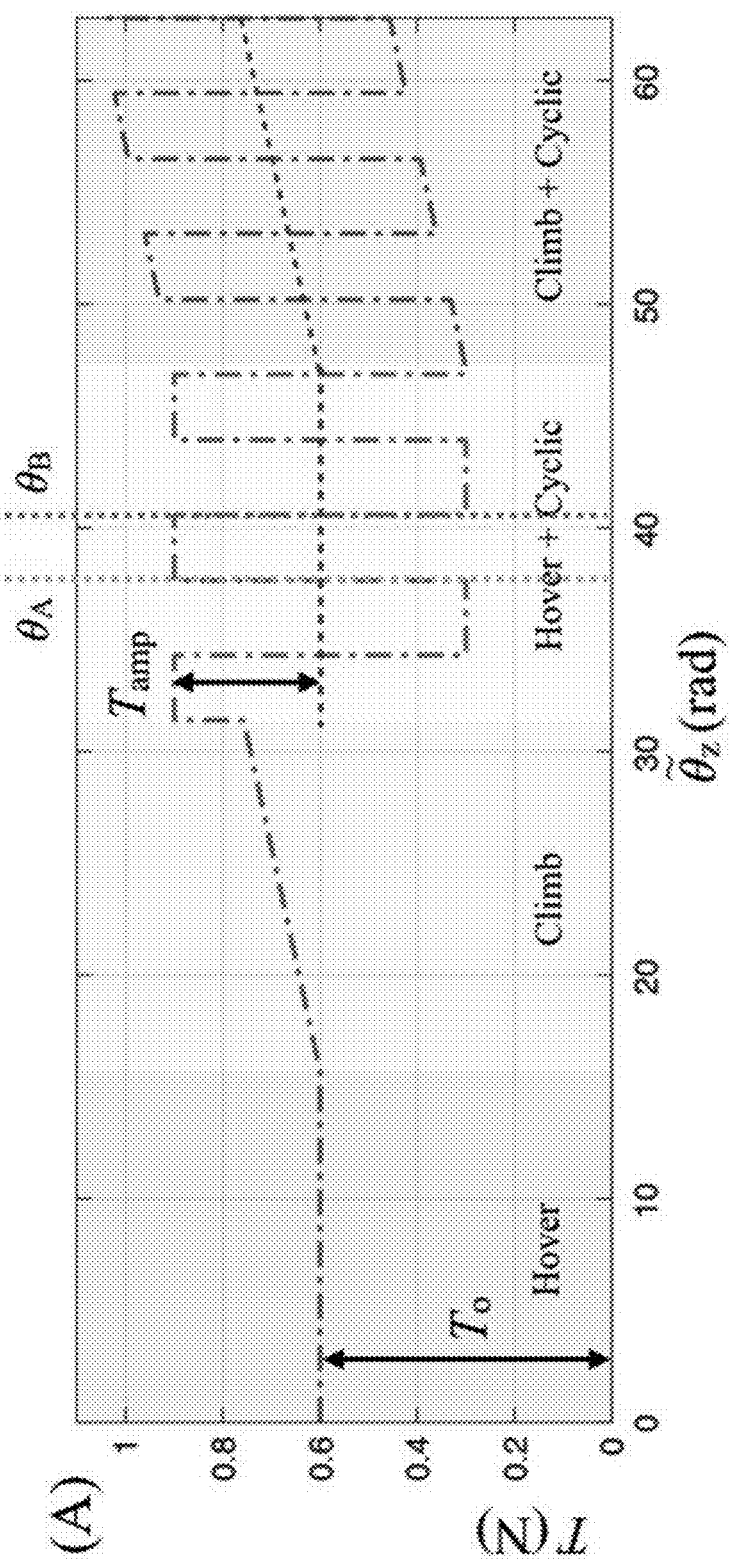
FIG. 8A illustrates a generic thrust plot for four different scenarios of flight, according to various example embodiments.
Figure 8B:
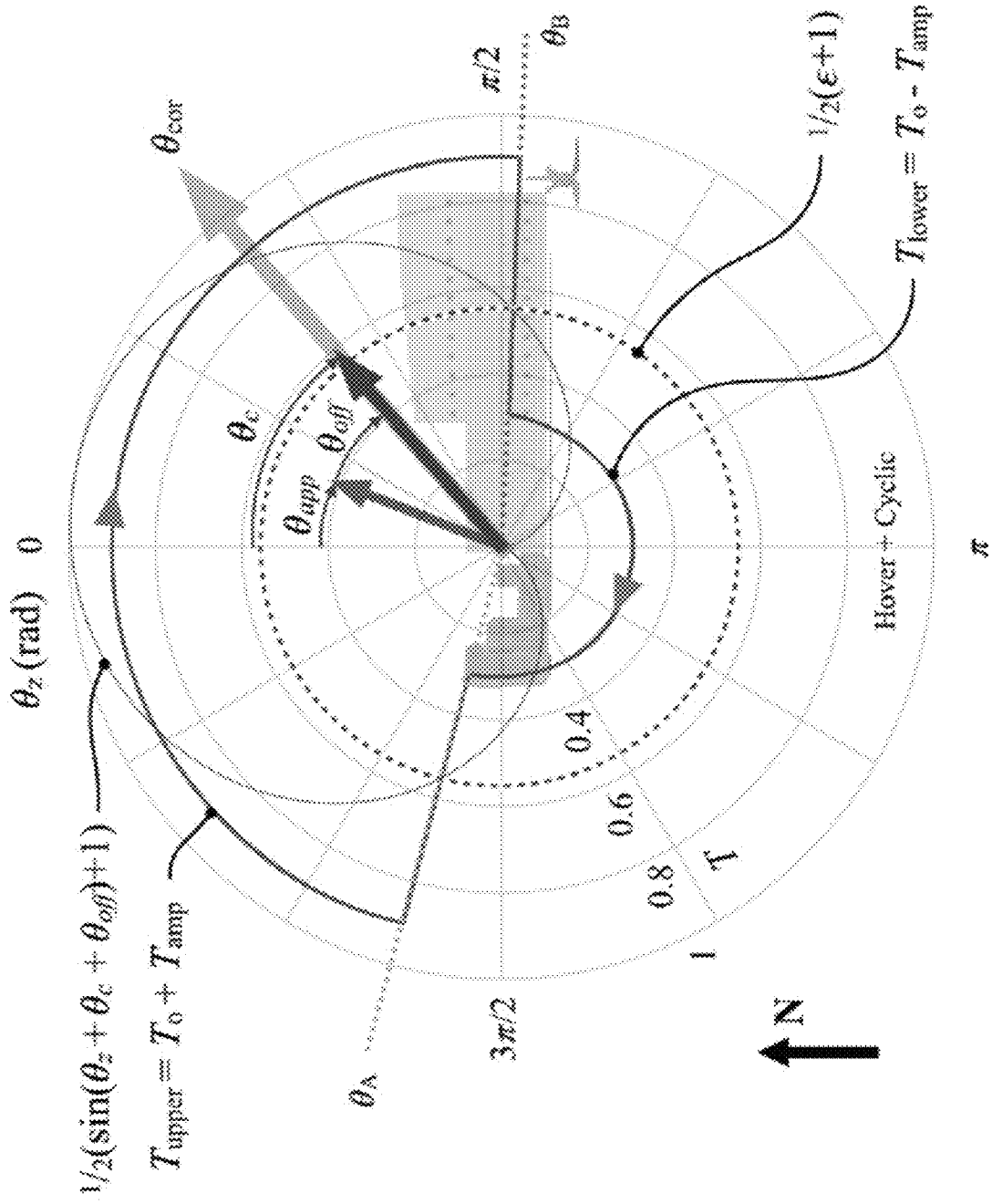
FIG. 8B illustrates a polar plot showing one period of square cyclic control during hover and cyclic phase according to various example embodiments.

On SAM, however, direct motor control allows a more rapid approach of cyclic control. One simple way to maximize the benefits of rapidly changing thrust is to use square waves. As shown in FIG. 8A, an arbitrary constant thrust with an arbitrary configuration of SAM results in hover flight. Increasing this thrust results in increasing the rotation speed of SAM which in turn creates more lift to start a climb. Decreasing the thrust, on the other hand, results in a descent. More particularly, FIG. 8A illustrates a generic thrust plot for four different scenarios of flight: hover, climb, hover+cyclic, and climb+cyclic. Definitions of $T_o$ and $T_{amp}$ are shown. $\theta_A$ and $\theta_B$ denote the rising and falling edges of the cyclic control signal, which are referenced to in FIG. 8B. $\tilde{\theta}_z$ is cumulative azimuth heading of SAM. During cyclic application of thrust, thrust is higher in a portion of the rotation period and lower in the remainder as shown in FIG. 8B. At an arbitrary cyclic thrust, the craft remains at constant altitude while moving. Increasing or decreasing the cyclic thrust results in climbing or descending while moving laterally. More particularly, FIG. 8B illustrates a polar plot showing one period of square cyclic control during hover+cyclic phase, plotted with non-dimensional thrust T as radial axis and true azimuth heading $\theta_z$ as angular axis. Rising and falling edges $\theta_A$ and $\theta_B$ occur when $\sin(\theta_z+\theta_c+\theta_{off})$ crosses c (both scaled for visibility). The resulting translational motion from cyclic effects is $\theta_{app}$ when $\theta_{off}$ is not applied, and $\theta_c$ or when $\theta_{off}$ is applied.

The parameter $T_o$ is the offset thrust. The effect of this parameter is similar to that of collective pitch control on helicopters. When flown manually, this parameter is mapped directly to the throttle stick value. The parameter $T_{amp}$ is the amplitude of the square wave. When flown manually, this parameter is mapped to the amplitude of pitch and roll input. Pitch and roll directions of the tip path plane (TPP) are defined in FIG. 8C. A tip path plane is the imaginary circular plane created by one revolution of SAM. Pitch and roll are defined to be the respective tilt directions as shown in the diagram. $T_{amp}$ and control direction $\theta_c$ of pitch and roll input may be defined as follows:

$$T_{amp} = k\sqrt{pitch^2 + roll^2} \quad \text{Equation (6)}$$

$$\theta_c = a\tan2\left(\frac{roll}{pitch}\right) \quad \text{Equation (7)}$$

where k is a constant to scale the effectiveness of pitch and roll commands.

Square cyclic control for thrust T may be defined as follows:

$$T = \begin{cases} T_o + T_{amp}, & \text{if } \sin(\theta_z + \theta_c + \theta_{off}) > \epsilon \\ T_o - T_{amp}, & \text{otherwise} \end{cases} \quad \text{Equation (8)}$$

where $\theta_z$ is the current azimuth heading of the craft, $\theta_c$ is the desired control direction of the craft, $\theta_{off}$ is the angle correction offset due to gyroscopic precession and other effects, and $\epsilon$ is the variable to control the duty cycle.

Figure 8D:
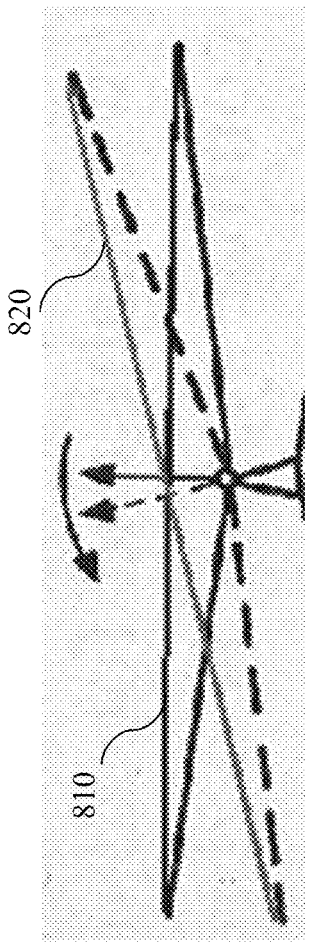
FIGS. 8C-8D illustrate a diagrams of a tip path plane according to various example embodiments.
Figure 8C:
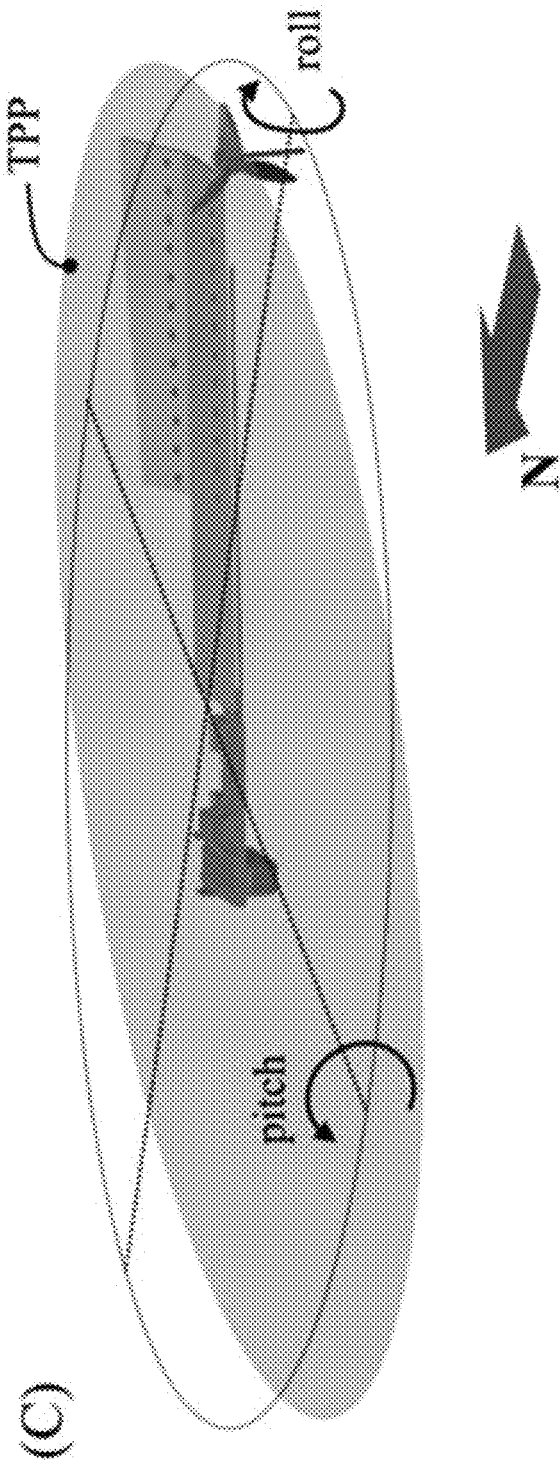

The tip path plane, is the plane connecting the rotor blade tips as they rotate. For example, the path of a point on the tip of the rotor/wing will form a ring/plane in a complete revolution. The angle of the plane may be measured accordingly with a known world frame. While hovering, the thrust vector of a helicopter is oriented upwards, perpendicular to the tip path plane. In order for the helicopter to travel forward, this thrust vector needs to be rotated slightly in the forward direction. To rotate the thrust vector, it is in turn necessary to rotate the TPP by the same amount. FIG. 8D illustrate the hovering 810 tip path plane, and the forward 820 tip path plane. Same tip path plane analogy may be applied in the mono-wing aerial device according to various example embodiments. Referring to FIG. 8C, as the craft flies to north (N), a change in the tip path plane with respect to the horizontal plane may be seen.

Figure 9A:
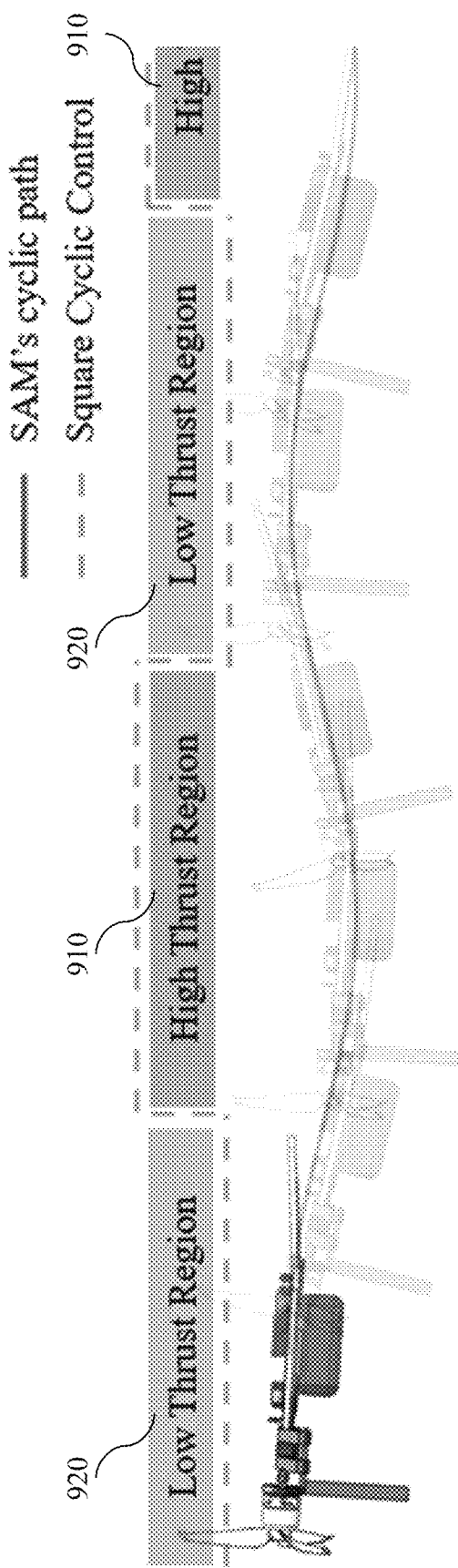
FIGS. 9A-9B show generic flight path of square cyclic control for directional control according to various example embodiments.
Figure 9B:
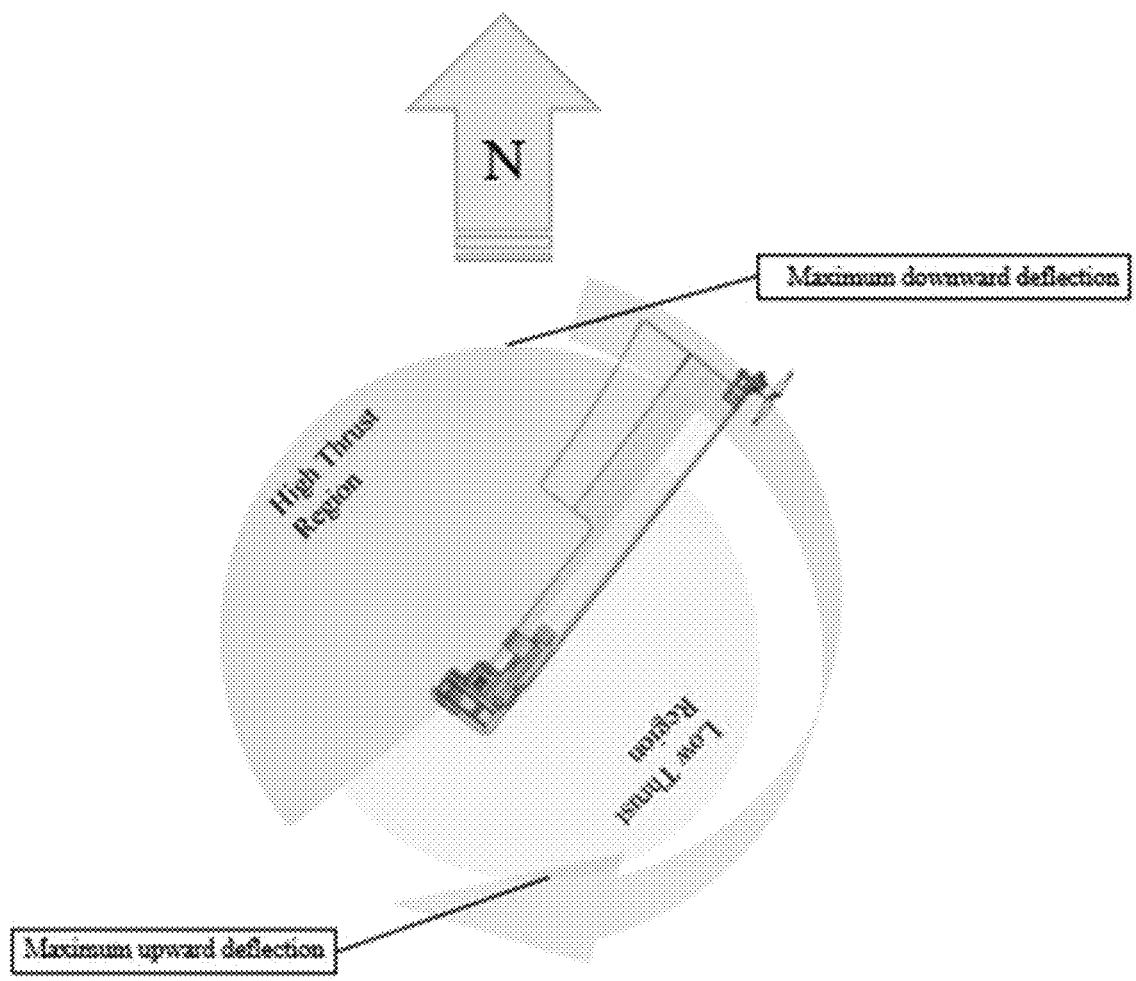

FIGS. 9A-9B shows generic flight path of square cyclic control for directional control according to various example embodiments. This periodically increasing and decreasing thrust changes the tip path plane of the craft. When the tip path plane is viewed from the craft's perspective (viewed from wing side), cyclic path would be like a smooth sine wave pattern. High thrust regions 910 and low thrust regions 920 are illustrated. Like any other rotating objects, gyroscopic precession can be observed in SAM when control is applied.

The control is done by square cyclic motor control. The tiny motor has relatively small inertia and square signal is a better choice for responsive control. As shown in FIG. 8A above, motor control signal $T_o$ is the offset thrust for hover. The effect of this parameter is similar to that of collective pitch control on helicopters. When flown manually, this parameter is mapped directly to the throttle stick value. The parameter $T_{amp}$ is the amplitude of the square wave.

Cascaded Optimization of Design and Control Variables

A cascaded optimization using GA may be run to find (i) the shape of the wing planform (e.g., shape of the trailing edge) and configuration of the motor (location, orientation), and (ii) the parameters of the square cyclic control.

Formulation

The first optimization intends to find the shape of the wing planform and configuration of the motor (location, orientation) for minimum thrust and minimum unwanted oscillations for hover state. Rotary crafts tend to enter oscillation circles which either grow (unstable platform) or degrade (stable platform), directly resulting from a combination of gyroscopic precession and aerodynamic forces. This behavior is sometimes informally referred to as 'toilet-bowling'.

This effect may be minimized according to various example embodiments which is most effectively measured by oscillations in $\Omega_x$ and $\Omega_y$.

The variables for the first formulation, shown in Table I in FIG. 10, and with reference to FIG. 6A and FIG. 6B, may be expressed in a single concatenated vector $\Gamma_1 = [C_1, C_2, C_3, C_4, c_{le}, dr, M_x, M_\theta, B_y]^T$. the first four variables ($C_1$, $C_2$, $C_3$ and $C_4$) are polynomial coefficients for chordwise wing shape in Equation (5) and are real numbers, while the rest are integer valued. The variables for the second formulation are also expressed in a single concatenated vector $\Gamma_2 = [T_{amp}, \epsilon]^T$ where all are real numbers.

For the first optimization problem, each solution generated by GA is run in Simulink for a simulated period of 10 s, where a manually tuned Proportional-Integral-Differential (PID) control system keeps SAM model hovering at a height of about 0 m. Flight characteristics are measured within this simulated period to calculate the total score of the objective function (main objective function of the first formulation).

The main objective function for the first formulation includes four sub-objective functions, namely $F_1$, $F_2$, $F_3$ and $F_4$. $F_1$ is the sub-objective function for average thrust value at hover, which is defined as follows:

$$F_1 = \frac{\sum_{i=n_1}^{n_2} T(t_i)}{n_2 - n_1} \quad \text{Equation (9)}$$

where $T(t_i)$ indicates the instantaneous thrust values in Newtons resulting from PID response to keep SAM hovering.

$F_2$ is the sub-objective function for average rotation speed and is defined as follows:

$$F_2 = \left( \frac{\sum_{i=n_1}^{n_2} \Omega_Z(t_i)}{n_2 - n_1} + 37.7 \right)^2 \quad \text{Equation (10)}$$

where $\Omega_Z(t_i)$ is a negative value and 37.7 rad/s is the target rotation speed. Preliminary physical experiments showed a SAM device of similar weight and wing planform rotated at about 37.7 rad/s (6 Hz). $F_3$ is the sub-objective meant to penalize an oscillating $V_Z$ value and is defined as follows:

$$F_3 = \frac{\sum_{i=n_1}^{n_2} |V_Z(t_i)|}{n_2 - n_1} \quad \text{Equation (11)}$$

where the value of $F_3$ will increase if $V_Z$ fluctuates around 0 for hover. $V_Z$ denotes velocity of the mono-wing aerial device in Z axis of $\Psi_B$ frame.

$F_4$ is the sub-objective penalty function for undesired oscillations and is defined as follows:

$$F_4 = \frac{\sum_{i=n_1}^{n_2} \left( \Omega_X(t_i)^2 + \Omega_Y(t_i)^2 \right)}{n_2 - n_1} \quad \text{Equation (12)}$$

where $\Omega_X$ and $\Omega_Y$ are angular velocities in the X and Y-axes respectively. The sub-objective functions are combined together to yield the final objective function for the first optimization which is summarized as follows:

$$\min_{\Gamma_1} \kappa_1 F_1 + \kappa_2 F_2 + \kappa_3 F_3 + \kappa_4 F_4 \quad \text{Equation (13)}$$

where $\kappa_1$, $\kappa_2$, $\kappa_3$ and $\kappa_4$ are the weightage coefficients of each sub-objective function.

In various example embodiment, for the second optimization problem, each solution generated by GA is run in Simulink for a simulated period of 20 s, where a PID system keeps SAM model flying at height 0 m. After hoving for 10 s, the square cyclic control is applied at a constant amplitude and direction using the optimizing variables $T_{amp}$ and $\epsilon$. The main objective function for the second formulation includes three sub-objective functions, namely $G_1$, $G_2$ and $G_3$. The first sub-objective function $G_1$ is negative of the distance travelled under square cyclic command, as follows:

$$G_1 = -\sqrt{(d_X(t_s) - d_X(t_f))^2 + (d_Y(t_s) - d_Y(t_f))^2} \quad \text{Equation (14)}$$

where $d_X$ and $d_Y$ are distances of the craft's body frame from origin in X and Y axis respectively, $t_s$ and $t_f$ denote the starting time when control is applied and final time of the simulation respectively.

$G_2$ is the sub-objective function to penalize a fluctuating value of height while under square cyclic command, as follows:

$$G_2 = -\frac{\sum_{i=n_3}^{n_4} |d_Z(t_i)|}{n_4 - n_3} \quad \text{Equation (15)}$$

where the value of F3 will increase if the craft's altitude $d_Z$ fluctuates around 0 for hover. The target hover altitude is set at 0 m. $G_3$ is penalty function for undesired oscillations, measuring the 'toilet-bowl' phenomenon. Similar to previous optimization, it may be defined as follows:

$$G_3 = \frac{\sum_{i=n_3}^{n_4} \left( \Omega_X(t_i)^2 + \Omega_Y(t_i)^2 \right)}{n_4 - n_3} \quad \text{Equation (16)}$$

where $\Omega_X$ and $\Omega_Y$ are angular velocities in the X and Y-axes respectively. The penalty function for undesired oscillations $G_3$ for example may be measured at different periods in different simulations from the penalty function for undesired oscillations $F_4$. The sub-objective functions are combined together to yield the final objective function for the second optimization which is summarized as follows:

$$\min_{\Gamma_2} \beta_1 G_1 + \beta_2 G_2 + \beta_3 G_3 \quad \text{Equation (17)}$$

where $\beta_1$, $\beta_2$ and $\beta_3$ are the weightage coefficients of each sub-objective function.

Optimization Results

The optimum solutions are found using MATLAB's ga function. The algorithm runs by first generating a population of 100 random possible solutions and running each in solution through MATLAB Simulink. Using the result of each simulation, the objective function score is calculated and the best individual is determined for the population. At this point, another set of possible solutions of population 100 is generated from the best individual using cross-over and mutation functions. The optimization is stopped and considered to have found the optimum solution when either a maximum of 120 generations is reached or the solution has not improved for 20 generations.

In various example embodiment, the optimum solution set for the first optimization is $\Gamma_1=[-0.0096, 0.1116, 1.3272, 44.5336, 70, 17, -65, -1, 0]^T$ achieving an objective function score of 9321.74, stopping after stalling for 20 generations at 89 generations. The optimum solution set for the second optimization is $\Gamma_2=[0.1491, 0.0676]^T$ achieving an objective function score of −1643.5, stopping after stalling for 20 generations at 70 generations.

GA finds the optimum solution from a parallel pool of possible solutions. Thus, it is less likely to be trapped in a local optimum like traditional methods, which search from a single point. The optimum solution found in according to various example embodiments relies on the assumptions that Blade Element Theory (BET) and flat plate coefficients are sufficient to model SAM's flight dynamics.

Simulation Results

Using the optimum mechanical configuration found in the previous section, SAM's flight is simulated with initial conditions defined in Table II illustrated in FIG. 11. The simulation serves as a way to predict SAM's steady state flight dynamics and control dynamics. At steady state hover, SAM is observed to rotate at $\Omega_Z$=−43.2 rad/s, with a thrust of about T=0.7N. A decaying 'toilet bowl' is observed.

Figure 12:
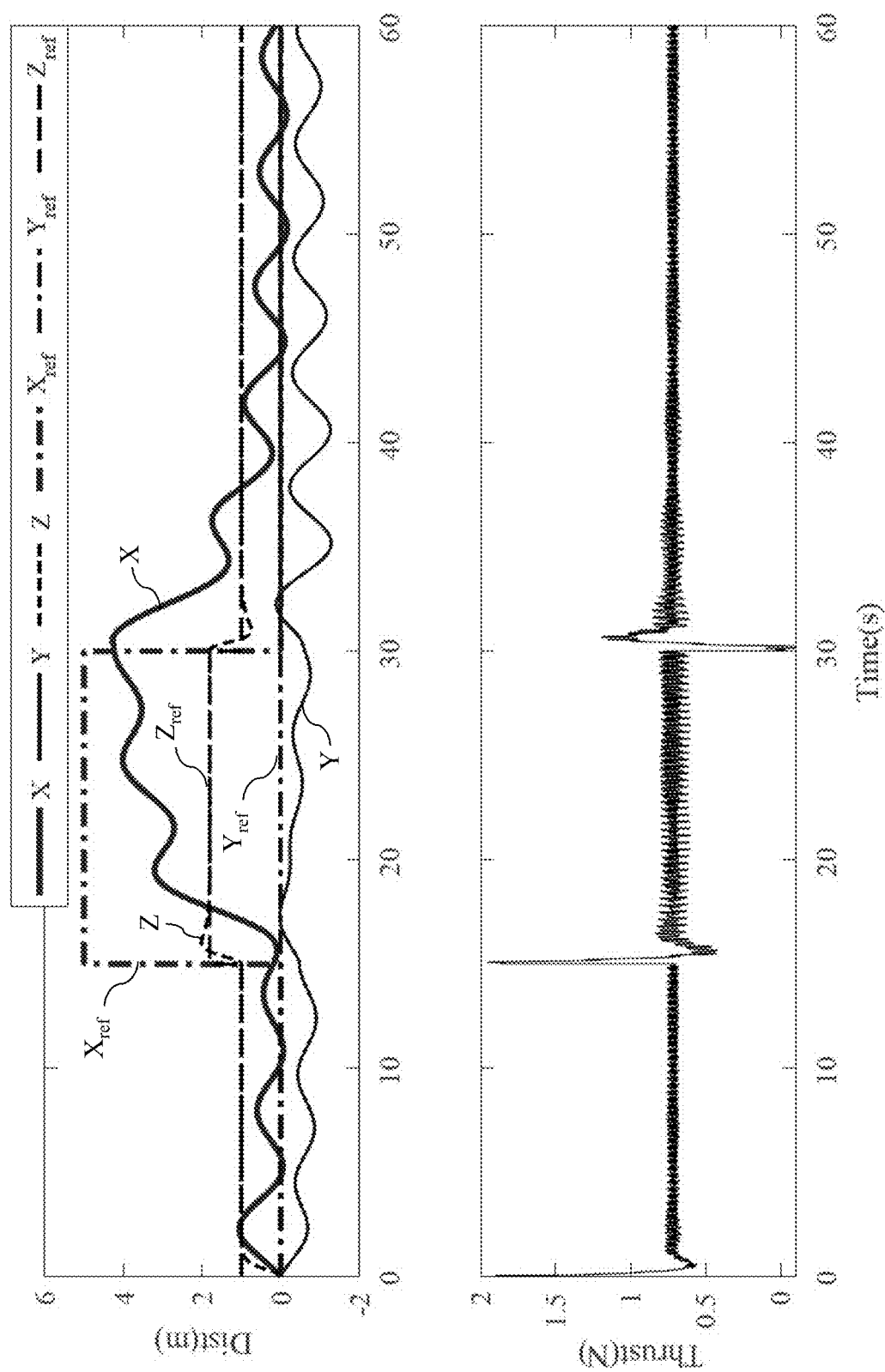
FIG. 12 shows simulated flight data of the mono-wing aerial device according to various example embodiments.

A PID controller is used to control the altitude and is manually tuned. Position control is achieved by a cascaded control strategy with an inner loop square cyclic controller and an outer loop P controller giving pitch and roll commands. The model was tasked to hover at origin at 1 m altitude for 15 seconds. It was then tasked to move to coordinate (5,0,1.8) for another 15 seconds and then back to (0,0,1) for the remainder of the duration. Altitude control response has a rise time of 0.38 s and settling time of 3.33 s whereas position control response has rise time of 7.20 s and settling time of 14.48 s. From the results shown in FIG. 12, it can be observed that altitude control response is stable, while position control is impeded by nonlinear effects of the platform. More particularly, FIG. 12 shows simulated flight data of SAM with PID controller for altitude and P controller for position, tracking waypoints (0,0,1), (5,0,1.8).

Experimental Investigation

Figure 13A:
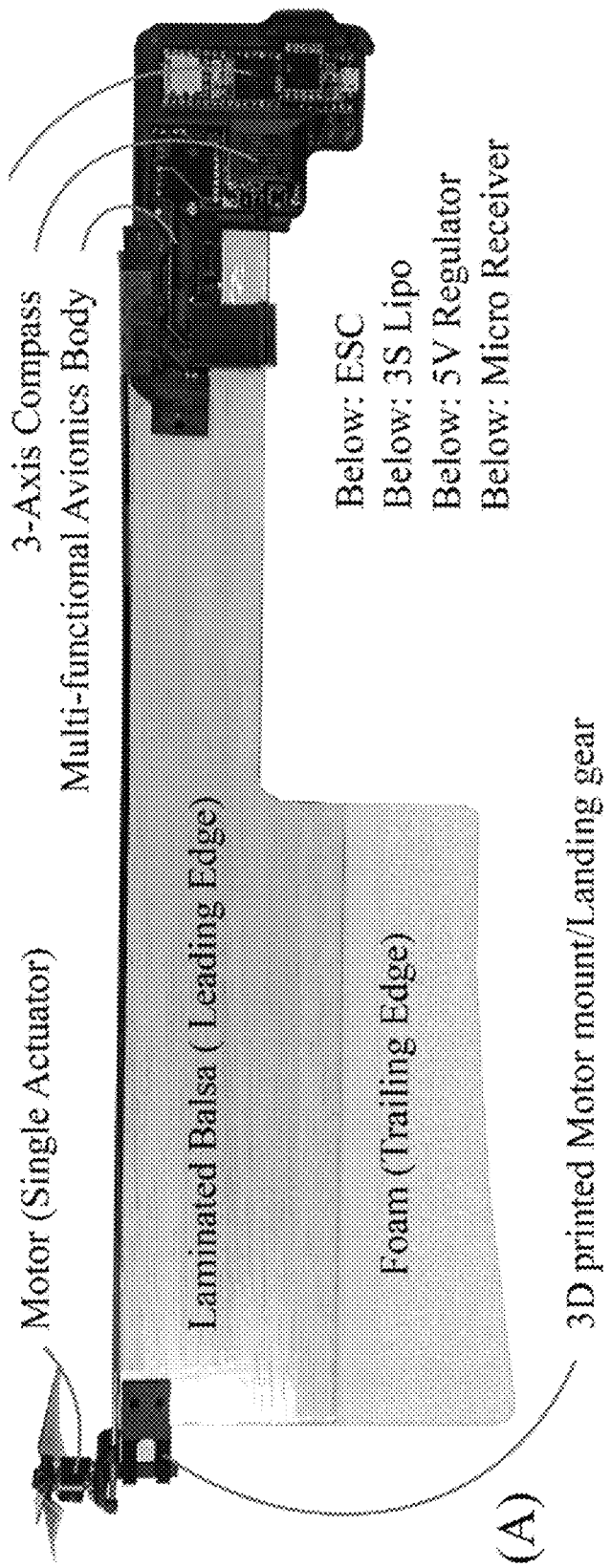
FIG. 13A shows components of a physical device of the mono-wing aerial device according to various example embodiments.

FIG. 13A shows components of a physical device of SAM according to various example embodiments. FIG. 13A shows primary electronic components of SAM: a microcontroller Teensy 3.5 (PJRPC), a 3-axis magnetometer (PNI RM3100), a 9DOF IMU (EM7180 SENtral), a micro-receiver (FrSky), a step-down 5V regulator, a 3 s 360 mAh lithium-polymer battery (NXE Power), a F15/KV6000 (T-motor), a Avan Mini propeller (3×2.4×3 CW, Emax) and a F30A ESC (T-motor). For example, the hardware includes a Printed Circuit Board as a structural component. The main components of the aerodynamic surfaces are a leading edge and a trailing edge. The former is made from laser-cut balsa which has higher density and strength whereas the latter is made of laser-cut foam. The leading edge is 3 mm balsa and the trailing edge is 3 mm foam. The components are strategically placed such that the centre of gravity is located close to the main body (housing member) hence maximizing the usable wing area. The all-up weight (AUW) for above configuration is about 102.56 g. The prototype hovers at 38% of throttle range which is approximately 73 g of thrust. However, motor thrust values are obtained from static bench test that does not account for miscellaneous losses that occur in practical such as propeller tip losses and drag induced by seed body. For example, the device which weighs 102 g has a flight time of 1 mins on a 3 s 360 mAh Lipo battery.

Square Cyclic Control in OptiTrack

Figure 13B:
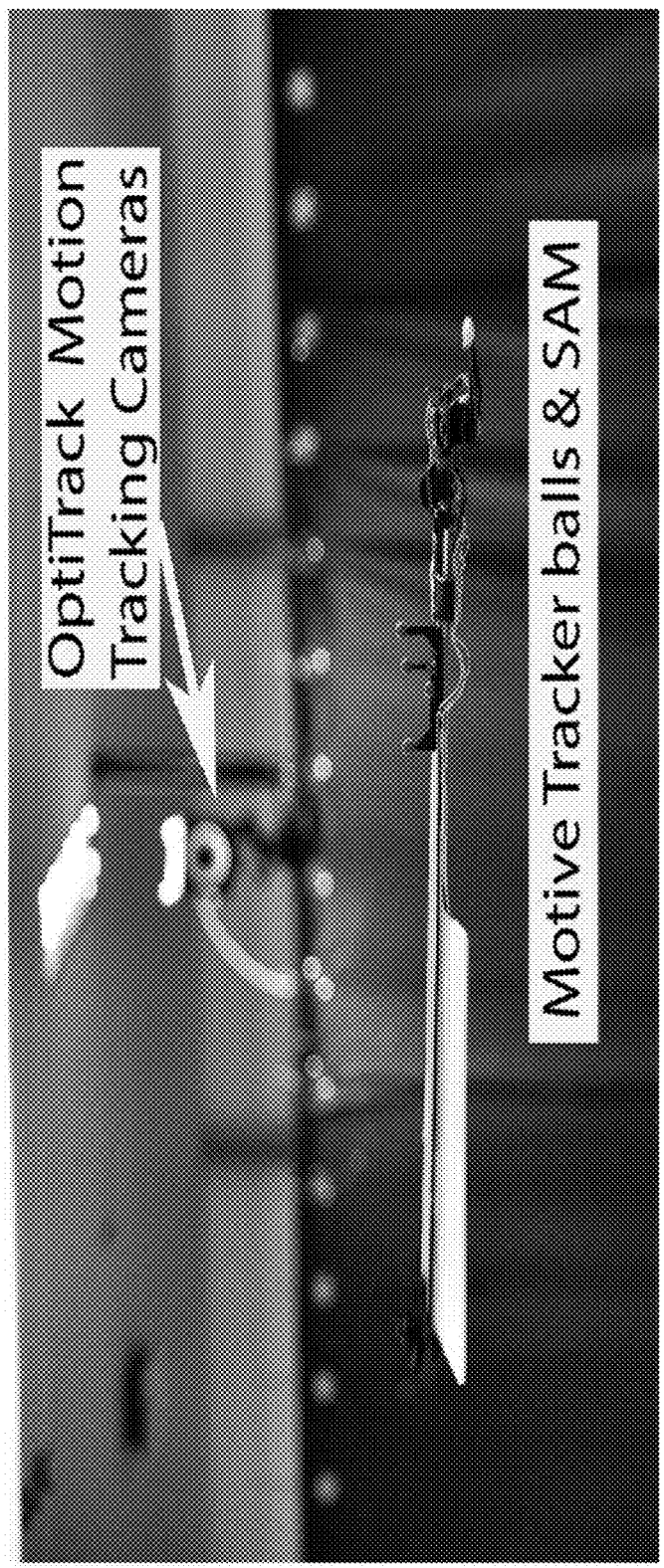
FIG. 13B illustrates a flying mono-wing aerial device according to various example embodiments under OptiTrack system.
Figure 14A:
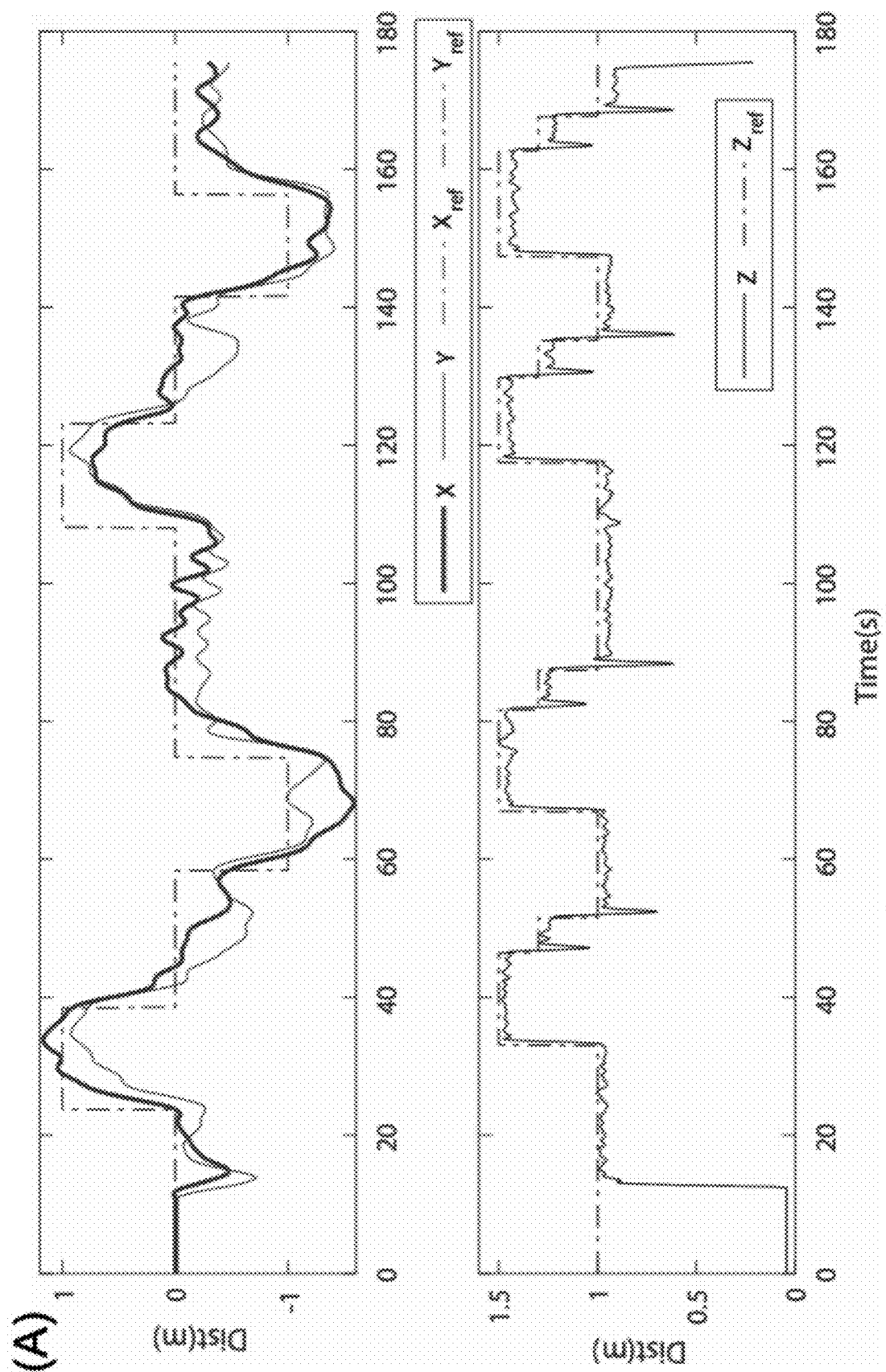
FIGS. 14A-14B illustrate experimental flight data of the mono-wing aerial device according to various example embodiments, using waypoint commands.
Figure 14B:
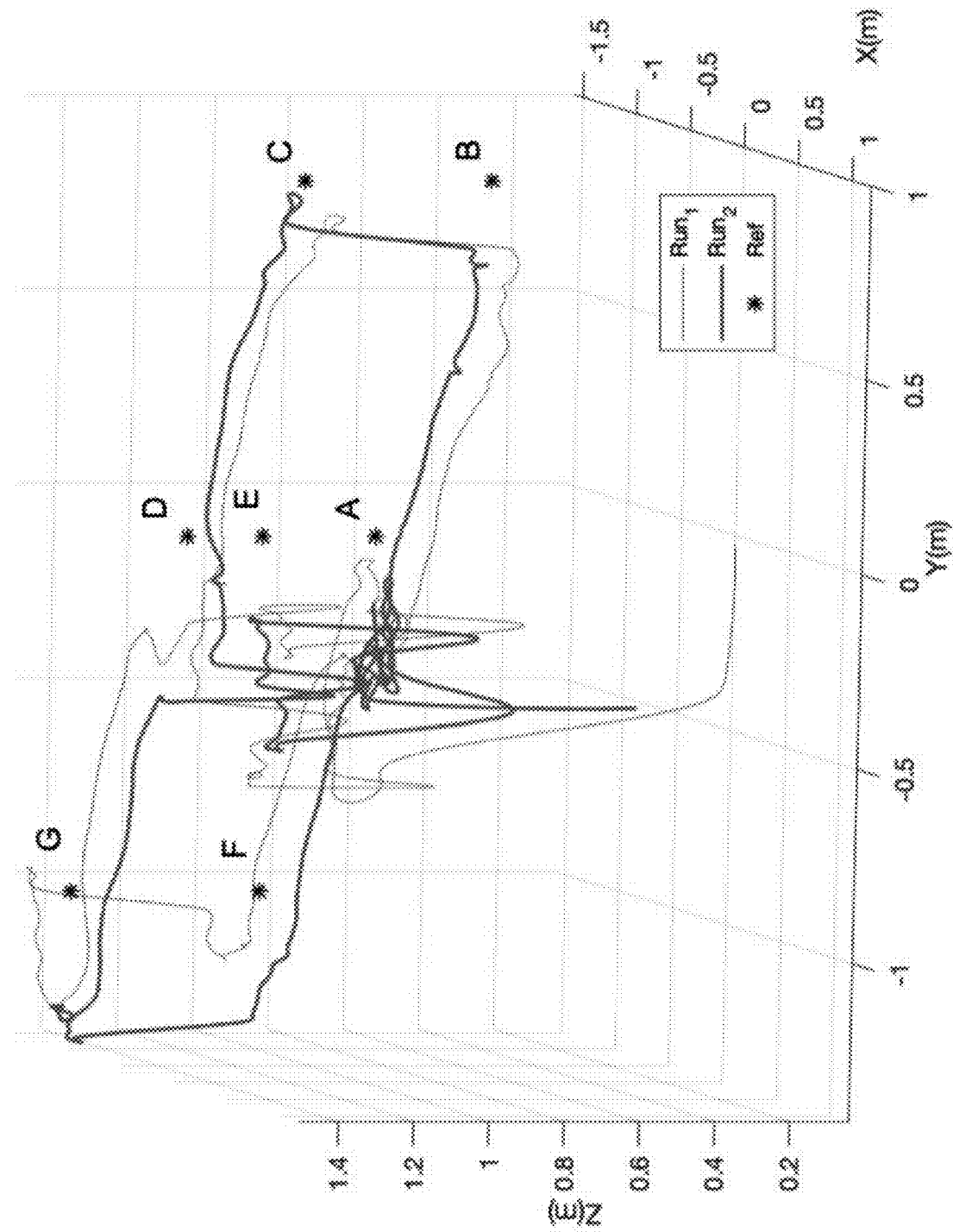

According to various example experiments, the OptiTrack system was used to provide position and orientation data for closed-loop control. FIG. 13B illustrates a flying SAM under OptiTrack system. Using the Z height measured in world frame, a closed loop PID to control altitude was first implemented. Next, the live quaternion information was used to find the TPP of the craft. More information regarding TPP can be found in S. K. H. Win, T. H. Goh, J. E. Low, D. S. B. Shaiful, L. T. S. Win, G. S. Soh, and S. Foong, "Direction controlled descent of Samara Autorotating Wings (SAW) with n-wings," in *IEEE Int. Conf on Robot. and Autom.*, 2018, pp. 6553-6559. Next, using a simple P controller, the TPP was stabilized in both pitch and roll axes of the $\Psi_B$. Finally, another P controller was applied to implement lateral position control in $\Psi_{W''}$ frame, in parallel to the TPP control. The onboard Teensy and magnetometer provided an inner-loop square cyclic control, receiving throttle, pitch and roll commands from a computer running MATLAB linked to the OptiTrack System. The overall control architecture is similar to that described earlier in the Simulation Results Section, but with the addition of TPP controller for the experiment. The TPP controller is intended to stabilize the craft, hence minimize crashes. The craft was commanded to fly towards waypoints forming a FIG. 8 pattern twice, as shown in FIGS. 14A-14B. The waypoints are A(0,0,1), B(1,1,1), C(1,1,1.5), D(0,0,1.5), E(0,0,1.3), F(−1,−1,1), G(−1,−1,1.5). The prototype took off from the ground and is manually triggered to move in this sequence: A-B-C-D-E-A-F-G-D-E-A and repeated once. The altitude control is observed to be very responsive as in the simulation. It is due to motor control having direct authority over Z axis response. The position control, however, is slower and has steady state errors. It could be due to the nature of indirect control of motor over TPP of the vehicle and its inherent gyroscopic nature. This may be fixed readily by adding an integrator to the controller, but nonlinear controllers may also be used to accommodate the nonlinear nature of the craft. More particularly, FIGS. 14A-14B illustrate experimental flight data of SAM, using waypoint commands forming a FIG. 8 pattern for two runs, where FIG. 14A shows XYZ plotted against time, while FIG. 14B shows a three-dimensional (3D) plot with waypoints A-G.

Overall, the experiment shows that SAM, although a highly under-actuated system, can achieve altitude and position control.

Hover Flight Test

Using the closed-loop control in the OptiTrack environment, SAM was hovering at a constant height of 1 m at position (0,0) for endurance test. The flight time was logged at 10 mins 10 seconds when the vehicle has landed. Total consumed capacity for the recorded flight was 340 mAh. From the recorded data, average current draw of 2A can be calculated based on used capacity (1224 Amp-sec) divided by total flight duration (610 sec). Using P=V*I, estimated power consumption of SAM is calculated to be 25 W during hovering. Additional flight time test was done using a larger 3S 900 mAh Lipo battery and lasted over 20 mins. Although larger battery changes SAM's center of mass location and rotational speed, its stability is maintained.

As described, a highly underactuated monocopter with 5DOF control is provided. By optimizing its wing planform for minimum motor thrust during hover, a modest flight time is achieved. SAM may be the only platform in related works to not only achieve a controllable flight using a single actuator but also has the ability to take off on its own without requiring additional equipment. Additionally, it is able to fly without needing an expensive motion capture system due to its passive stability. Even though its practical applications may be fewer than multi-rotor, SAM has good payload capacity and flight duration. By harnessing SAM's inherently spinning nature to advantage, it has great potential for real world applications such as flying LIDAR for mapping and imaging, surveillance and SAR operations. Furthermore, SAM is very inexpensive to be mass produced for large scale applications and can be made disposable.

While embodiments of the disclosure have been particularly shown and described with reference to specific embodiments, it should be understood by those skilled in the art that various changes in form and detail may be made therein without departing from the scope of the disclosure as defined by the appended claims. The scope of the disclosure is thus indicated by the appended claims and all changes which come within the meaning and range of equivalency of the claims are therefore intended to be embraced.

What is claimed is:

1. A mono-wing aerial device comprising:
a housing member having disposed thereon electronic components and a power source, including a controller configured to control a thrust unit;
a wing member coupled to the housing member, the wing member configured to produce aerodynamic forces for autorotation of the aerial device, the wing member comprising a first edge portion proximal to the housing member and a second edge portion distal to the housing member, wherein the wing member is coupled to the housing member at the first edge portion; and
the thrust unit coupled to the wing member at the second edge portion, wherein the thrust unit is configured to generate thrust in a direction substantially tangential to a rotational plane of the wing member, wherein
the wing member comprises a leading portion and a trailing portion, each of the leading portion and the trailing portion being a flat plate airfoil, the wing member having an inner wing region with the first edge portion and an outer wing region with the second edge portion, and the trailing portion being arranged along a length of the leading portion in the outer wing region, and
the controller is configured to control the thrust unit to generate the thrust for flight control, including directional control, of the mono-wing aerial device based on a square cyclic control.

2. The mono-wing aerial device of claim 1, wherein the second edge portion comprises a first side of the leading portion distal to the housing member and a first side of the trailing portion distal to the housing member, and the thrust unit is connected to the first side of the leading portion distal to the housing member.

3. The mono-wing aerial device of claim 1, wherein the leading portion comprises a second side proximal to the housing member, and the trailing portion comprises a second side proximal to the housing member, and the second side of the trailing portion being offset from the second side of the leading portion by a predetermined distance.

4. The mono-wing aerial device of claim 1, wherein the leading portion is formed of a different material from the trailing portion.

5. The mono-wing aerial device of claim 4, wherein the leading portion is formed of wood and the trailing portion is formed of a solid foam material.

6. The mono-wing aerial device of claim 1, wherein the square cyclic control comprises a first parameter relating to an offset thrust and a second parameter relating to an amplitude of a square wave.

7. The mono-wing aerial device of claim 1, wherein the thrust unit comprises a motor and a propeller.

8. The mono-wing aerial device of claim 1, wherein the housing member is a printed circuit board.

9. The mono-wing aerial device of claim 1, wherein the housing member has a memory disposed thereon, and the controller is communicatively coupled to the memory and configured to control the thrust unit to generate the thrust in the direction substantially tangential to the rotational plane of the wing member.

10. A method of forming a mono-wing aerial device, the method comprising:
providing a housing member having disposed thereon electronic components and a power source, including a controller configured to control a thrust unit;
coupling a wing member to the housing member, the wing member configured to produce aerodynamic forces for autorotation of the aerial device, the wing member comprising a first edge portion proximal to the housing member and a second edge portion distal to the housing member, wherein the wing member is coupled to the housing member at the first edge portion; and
coupling the thrust unit to the wing member at the second edge portion, wherein the thrust unit is configured to generate thrust in a direction substantially tangential to a rotational plane of the wing member, wherein
the wing member comprises a leading portion and a trailing portion, each of the leading portion and the trailing portion being a flat plate airfoil, the wing member having an inner wing region with the first edge portion and an outer wing region with the second edge portion, and the trailing portion being arranged along a length of the leading portion in the outer wing region, and
the controller is configured to control the thrust unit to generate the thrust for flight control, including directional control, of the mono-wing aerial device based on a square cyclic control.

11. The method of claim 10, wherein a planform of the wing member and a location and orientation of the thrust unit at the second edge portion of the wing member is configured based on a first multi-component objective optimization function including a plurality of components for minimum thrust and minimum undesired oscillations at hover state using a genetic algorithm.

12. The method of claim 11, wherein the plurality of components of the first multi-component objective optimization function comprises a first component relating to an average thrust at hover, a second component relating to an average rotation speed, a third component relating to oscillations in a hover state, and a fourth component relating to a penalty function for undesired oscillations.

13. The method of claim 11, wherein the planform of the wing member and the location and orientation of the thrust unit at the second edge portion of the wing member is configured based on a second multi-component objective optimization function including a plurality of components relating to the square cyclic control using the genetic algorithm.

14. The method of claim 13, wherein the plurality of components of the second multi-component objective optimization function comprises a fifth component relating to a distance travelled under a square cyclic command, a sixth component relating to a fluctuating height of the mono-wing aerial device under the square cyclic command, and a seventh component relating to a penalty function for undesired oscillations.

15. The method of claim 10, wherein the second edge portion comprises a first side of the leading portion distal to the housing member and a first side of the trailing portion distal to the housing member, and the thrust unit is connected to the first side of the leading portion distal to the housing member.

16. The method of claim 10, wherein the trailing portion comprises a second side proximal to the housing member, the second side being offset from the housing member by a predetermined distance.

* * * * *